United States Patent
Imokawa et al.

(10) Patent No.: US 9,512,331 B2
(45) Date of Patent: *Dec. 6, 2016

(54) SURFACE TREATMENT AGENT FOR ZINC OR ZINC ALLOY COATED STEEL SHEET, ZINC OR ZINC ALLOY COATED STEEL SHEET, AND METHOD OF PRODUCING THE STEEL SHEET

(75) Inventors: Toru Imokawa, Tokyo (JP); Nobue Fujibayashi, Tokyo (JP); Takahiro Kubota, Tokyo (JP); Etsuo Hamada, Tokyo (JP); Masayasu Nagoshi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1120 days.

This patent is subject to a terminal disclaimer.

(21) Appl. No.: 13/581,146

(22) PCT Filed: Feb. 25, 2011

(86) PCT No.: PCT/JP2011/001098
§ 371 (c)(1),
(2), (4) Date: Nov. 29, 2012

(87) PCT Pub. No.: WO2011/105101
PCT Pub. Date: Sep. 1, 2011

(65) Prior Publication Data
US 2013/0084453 A1    Apr. 4, 2013

(30) Foreign Application Priority Data

Feb. 26, 2010 (JP) ................................. 2010-043325

(51) Int. Cl.
| C09D 175/04 | (2006.01) |
| C23C 22/40 | (2006.01) |
| C09D 5/08 | (2006.01) |
| C09D 7/12 | (2006.01) |
| C08K 3/00 | (2006.01) |
| C08K 13/02 | (2006.01) |
| C09D 165/02 | (2006.01) |
| C09D 161/12 | (2006.01) |

(52) U.S. Cl.
CPC ........... *C09D 175/04* (2013.01); *C08K 3/0091* (2013.01); *C08K 13/02* (2013.01); *C09D 5/084* (2013.01); *C09D 7/1233* (2013.01); *C09D 161/12* (2013.01); *C09D 165/02* (2013.01); *C23C 22/40* (2013.01); *C08G 2150/90* (2013.01); *Y10T 428/273* (2015.01)

(58) Field of Classification Search
CPC ...................................................... C23C 22/40
See application file for complete search history.

(56) References Cited

U.S. PATENT DOCUMENTS 8,648,135 B2 * 2/2014 Fujibayashi ........... C09D 5/024
427/386

FOREIGN PATENT DOCUMENTS

| JP | 53121034 | 10/1978 | |
| JP | 57044751 | 9/1982 | |
| JP | 1177380 | 7/1989 | |
| JP | 11058599 | 3/1999 | |
| JP | 11310757 | 11/1999 | |
| JP | 2000248369 | 9/2000 | |
| JP | 2001059184 | 3/2001 | |
| JP | 2001181860 | 7/2001 | |
| JP | 2003-013252 | 1/2003 | |
| JP | 2003155451 | 5/2003 | |
| JP | 2004-018887 | 1/2004 | |
| JP | 2004238716 | 8/2004 | |
| JP | 3573307 | 10/2004 | |
| JP | 2006043913 | 2/2006 | |
| JP | 2006082365 | 3/2006 | |
| JP | 2006152435 A * | 6/2006 | |
| JP | 2006152436 | 6/2006 | |
| JP | 3883831 | 2/2007 | |
| JP | 4078044 | 4/2008 | |
| WO | WO 2006043727 A1 * | 4/2006 | ......... C08G 18/0809 |
| WO | WO 2010114171 A1 * | 10/2010 | ............. C09D 5/024 |

OTHER PUBLICATIONS

International Preliminary Report on Patentability for International Application No. PCT/JP2011/001098 dated Sep. 18, 2012.
Korean Office Action dated Feb. 7, 2014, application No. 10-2012-7024859 with English translation.

* cited by examiner

*Primary Examiner* — Monique Jackson
(74) *Attorney, Agent, or Firm* — RatnerPrestia

(57) ABSTRACT

The present invention provides a chromium-free surface treatment agent, comprising: a resin compound having a specific bisphenol skeleton; cationic urethane resin emulsion; silane coupling agent; an organic titanium chelate compound; a quadrivalent vanadyl compound; a molybdic acid compound; and water, wherein these components are blended at predetermined ratios such that pH value of the surface treatment agent is in the range of 4 to 5. The one-pack type chromium-free surface treatment agent of the present invention exhibits good stability during storage and is capable of forming on a metal material surface a coating film excellent in corrosion resistance at a bending-processed portion of a steel sheet, solvent resistance and paintability after alkali degreasing.

4 Claims, No Drawings

SURFACE TREATMENT AGENT FOR ZINC OR ZINC ALLOY COATED STEEL SHEET, ZINC OR ZINC ALLOY COATED STEEL SHEET, AND METHOD OF PRODUCING THE STEEL SHEET

CROSS REFERENCE TO RELATED APPLICATIONS

This application is a National Phase Application of International Application No. PCT/JP2011/001098, filed Feb. 25, 2011, which claims priority to Japanese Application No. 2010-043325, filed Feb. 26, 2010, the contents of which applications are incorporated herein by reference in their entireties for all purposes.

TECHNICAL FIELD

The present invention relates to a zinc or zinc alloy coated steel sheet suitable for automobiles, consumer electrical appliances, building materials, and the like, and in particular to an environmentally friendly zinc or zinc alloy coated steel sheet necessitating no chromium or the like during production process thereof. The present invention also relates to a method for manufacturing the zinc or zinc alloy coated steel sheet.

Further, the present invention relates to a surface treatment agent (solution) useful in terms of improving anti-black patina property and the like of a zinc or zinc alloy coated steel sheet.

PRIOR ART

There have been widely used, as the conventional steel sheets for consumer electric appliances, building materials and automobiles, steel sheets with surfaces subjected to chromating treatment with treatment liquid containing as primary components chromic acid, dichromic acid or salts thereof for improving corrosion resistance (resistance to occurrence of rust and/or white rust) thereof. This chromating treatment is an economical treatment method which enables improving corrosion resistance of a steel sheet relatively easily.

Chromating treatment uses hexavalent chromium, which is a substance subjected to pollution control. This hexavalent chromium used in chromating treatment is substantially prevented from contaminating the environment and human bodies because the substance is treated by a treatment process in a closed system to achieve complete reduction, retrieval and no release to the nature and also because dissolution of chromium from a chromate coating can be substantially prevented from occurring by a sealing effect by an organic coating film formed on the chromate coating. However, there has been vigorous demand for voluntarily reducing use of hexavalent chromium itself as best as possible in view of the recent global environmental problems. Further, there has also been a trend toward eliminating or reducing hexavalent chromium in a product so that hexavalent chromium should not contaminate the environment when the product is disposed as shredder dust.

In view of the global environmental problems as described above, there have been proposed a number of treatment techniques for preventing white rust from occurring in a zinc or zinc alloy coated steel sheet by not depending on chromating treatment, i.e. what is called "chromium-free" techniques. For example, there is a technique of forming a surface treatment film on a zinc or zinc alloy coated steel sheet by using a composition containing any of an inorganic compound, an organic compound and an organic polymer material, or combination of thereof. Although these chromium-free techniques of various types proposed up to now are useful, there have been confirmed new problems to be solved which emerged as these chromium-free techniques are prevalent in the art.

A first problem is that corrosion resistance at a processed portion of a zinc or zinc alloy coated steel sheet further subjected to surface treatment is still to be improved. A zinc or zinc alloy coated steel sheet subjected to an additional surface treatment is then further subjected to subsequent processing (cutting, bending, welding of parts, coating/painting) to be a final product. When such a zinc or zinc alloy coated steel sheet, subjected to an additional surface treatment for formation of a surface treatment film thereon, is further subjected to bending in particular, the zinc or zinc alloy coating is inevitably extended on the outer side of a bent portion and the surface treatment film is also extended and damaged by this bending operation, thereby exposing a zinc or zinc alloy coated surface of the steel sheet and causing a problem of corrosion resistance deterioration at the exposed portion. Such damages of surface treatment film and zinc or zinc alloy coating underneath the film occur continuously in the case of bending operation in particular (which is a good contrast with a localized damage caused by extrusion operation), thereby making it very difficult to obtain good corrosion resistance at a bending-processed portion of a steel sheet.

A second problem resides in how to ensure good solvent resistance of a surface treatment film of a steel sheet. When oily stains attached to a surface of a surface treatment film or symbols scribed on the surface with a marker pen on the coating film are wiped out with a solvent in the subsequent processing, a phenomenon is often observed in which the surface treatment film comes off and/or turns to a whitish color due to the solvent. Sufficient corrosion resistance cannot be obtained in a zinc or zinc alloy coated steel sheet from which a surface treatment film has come off and appearance quality significantly deteriorates in a zinc or zinc alloy coated steel sheet of which surface treatment film has turned white.

A third problem resides in how to ensure good paintability, of a surface treatment film of a steel sheet. A zinc or zinc alloy coated steel sheet, subjected to a surface treatment and the subsequent processes as described above, is washed with an alkali cleaner or the like (alkali degreasing) to clean surfaces thereof and then painted in some applications. That is, a surface treatment film is required to have good application property of top coating after alkali degreasing in some applications. However, there can be found no references which studied such a property as described above.

A fourth problem resides in how good corrosion resistance of a surface treatment film should be made compatible with good storage stability of a surface treatment agent for forming the coating film. Most of the recent chromium-free techniques are what is called "application and drying type (dry-in-place type)" which involves coating a zinc or zinc alloy plated steel sheet with a surface treatment agent and drying the steel sheet thus coated to form a surface treatment film thereon. The surface treatment film thus formed is required to exhibit at least a predetermined level of water resistance to cause a sufficient barrier effect. In other words, a surface treatment film which easily redissolves into water cannot ensure good corrosion resistance, i.e. a good barrier effect. However, regarding a surface treatment agent, it is industrially important that the surface treatment agent, prepared by blending respective raw materials by predetermined ratios to obtain a single solution, can be stably kept in storage and it is desired that the surface treatment agent can be stably stored for a relatively long period without experiencing any change in quality even at temperature in the range of 35° C. to 40° C. expected in summer. A surface treatment agent must not exhibit increased viscosity, gelling, generation of precipitation and the like, i.e. must exhibit at least a predetermined level of good water solubility, in order to have such good stability in storage. Further, a surface treatment agent must be able to maintain such good quality before, during and after a relatively long storage period.

A zinc or zinc alloy coated steel sheet having the aforementioned tasks also has a problem that a coated surface thereof tends to have black patina generated therein, i.e. a problem of "black patina phenomenon", when the zinc or zinc alloy coated steel sheet is left in a high-humid and high-temperature environment for a long time. This black patina phenomenon is conspicuous in a case where the zinc or zinc alloy coated steel sheet has a coating layer containing elements such as Mg. Al and the like in particular. Accordingly, a surface treatment film of a zinc or zinc alloy coated steel sheet needs to have good anti-black patina properties, as well.

Specific examples of the conventional chromium-free techniques are as follows. First, JP-A 53-121034 discloses a method for coating a metal surface with an aqueous solution containing water-dispersible silica, alkyd resin and a trialkoxysilane compound, and drying the metal surface to form a coating film thereon.

Further, JP-B 57-044751 discloses a surface treatment method for imparting a metal material with corrosion resistance by using a water-soluble resin including a hydroxypyrone compound derivative. JP-A 01-177380 discloses a method for imparting a metal material with corrosion resistance by using an aqueous solution of a hydroxystyrene compound or a water-dispersible polymer.

JP-A 11-310757 discloses a technique of using a surface treatment agent obtained by blending a water-based resin, colloidal silica and ammonium vanadate by specific ratios.

However none of the techniques of the aforementioned references has reached a stage of developing a coating film having corrosion resistance high enough to replace a chromate conversion coating therewith.

Further, JP-A 2000-248369 discloses a technique of forming a surface treatment film containing an organic resin and a thiocarbonyl group-including compound. However, the surface treatment film of JP-A 2000-248369 fails to have sufficient corrosion resistance after alkali degreasing.

JP-A 11-058599 discloses a technique of treating a metal sheet surface with a treating liquid as a lithium silicate aqueous solution containing an organic resin, a silane coupling agent and a solid lubricant. A resulting surface treatment film of JP-A 11-058599, in which the inorganic components tend to form hard polymer, exhibits insufficient corrosion resistance at a processed portion such as a bending-processed portion of the metal sheet. The resulting surface treatment film also exhibits poor secondary adhesion in terms of paint application properties due to inclusion of alkali metal.

JP-A 2006-043913 discloses a technique of forming a resin film by using a resin aqueous solution prepared by blending a carboxyl group-including polyurethane resin, water dispersion of ethylene-unsaturated carboxylic acid copolymer, silica particles and a silane coupling agent by specific ratios. A resulting rein film of JP-A 2006-043913, however, has insufficient solvent resistance and unsatisfactory corrosion resistance at a processed portion of a steel sheet.

JP-B 3573307 discloses a steel sheet having a surface treatment film containing an urethane based resin, a lubricant, an inorganic colloid compound and a silane coupling agent at specific ratios This steel sheet, fundamentally based on electrodeposition coating, has good electrodeposition coating property but fails to exhibit sufficient corrosion resistance at a processed portion thereof.

JP-A 2001-059184 discloses a surface treatment agent prepared by blending a silane coupling agent and an urethane resin with pH thereof adjusted to be in the range of 2.5 to 4.5. A resulting surface treatment film of JP-A 2001-059184 exhibits poor corrosion resistance after alkali degreasing and insufficient solvent resistance.

JP 2003-155451 discloses a technique of forming a coating film by using treatment liquid containing a water-dispersible resin, silica particles and organic titanate by specific ratios. A resulting surface treatment film of JP 2003-155451 exhibits insufficient corrosion resistance at a processed portion of a steel sheet.

JP-A 2006-082365 and JP-A 2004-238716 each disclose a technique of forming a coating film by using treatment liquid containing: a specific aqueous epoxy resin dispersion; urethane resin dispersion; a silane coupling agent; phosphoric acid and/or a phosphoric acid compound; and a hydrazine derivative having 1-5 fluorine atoms or active hydrogen atom per one molecule. Resulting surface treatment films of JP-A 2006-082365 and JP-A 2004-238716, however, cannot reliably exhibit good corrosion resistance and paintability after alkali degreasing due to poor alkali resistance thereof and cannot have sufficient solvent resistance and corrosion resistance at a processed portion of a steel sheet, either.

JP-A 2001-181860 discloses a technique of forming a coating film by using treatment liquid containing a specific resin compound, a vanadium compound, and a metal compound including specific metal. A resulting surface treatment film of JP-A 2001-181860 cannot obtain good corrosion resistance after alkali degreasing because alkali resistance thereof is not necessarily sufficiently high. The resulting coating film of JP-A 2001-181860 cannot solve problems, e.g. a problem that a surface treatment film easily turns to yellow by heating, either.

JP-B 3883831 discloses a technique of forming a coating film by using a treatment agent containing a specific resin compound, a cationic urethane resin including a cationic functional group, a silane coupling agent including a reactive functional group, a Ti compound, and an acid compound by specific ratios. The technique of JP-B 3883831, although it can produce a coating film having good corrosion resistance and anti-fingerprint properties, does not study corrosion resistance after alkali degreasing, corrosion resistance at a processed portion of a steel sheet and solvent resistance and thus naturally fails to obtain satisfactory results in these characteristics.

JP-B 4078044 discloses a technique regarding a surface treatment agent containing at least one type of water-based resin selected from a cationic water-based resin and a nonionic water-based resin; a specific resin compound; a metal compound including specific metal; and water. The technique of JP-B 4078044 does not study corrosion resistance at a processed portion of a steel sheet and solvent resistance and thus fails to obtain satisfactory results in these characteristics.

JP-A 2006-152436 discloses a technique of using a surface treatment agent containing a cationic urethane, a cationic and phenolic polycondensate, titanium, and a compound including specific metal by specific ratios. However, JP-A 2006-152436 does not study solvent resistance and paintability, of a resulting surface treatment film and thus fails to obtain satisfactory results in these characteristics.

Further, the conventional surface treatment agents each containing a silane coupling agent unanimously exhibit poor stability in storage and often fail to maintain satisfactory characteristics/properties confirmed at preparation throughout a storage period, although appearances of these surface treatment agents look unchanged after the storage. Above all, the aforementioned references unanimously fail to address the fundamental tasks and problems as described above.

DISCLOSURE OF THE INVENTION

Problems to be Solved by the Invention

The present invention aims at solving the aforementioned problems of the prior art and an object thereof is to provide: an one-pack type chromium-free surface treatment agent for a zinc or zinc alloy coated steel sheet, exhibiting good storage stability and enabling formation at a surface of a metal material a coating film excellent in corrosion resistance, in particular corrosion resistance at a bending-processed portion of a steel sheet, solvent resistance, paintability after alkali degreasing, and anti-black patina properties; a zinc or zinc alloy coated steel sheet manufactured by using the surface treatment agent; and a method for manufacturing the zinc or zinc alloy coated steel sheet.

Means for Solving the Problem

As a result of a keen study to solve the aforementioned problems, the inventors of the present invention discovered that: it is possible to form a coating film excellent not only in corrosion resistance, solvent resistance and application properties of paint but also anti-black patina properties by treating a surface of a zinc or zinc alloy coated steel sheet with a surface treatment agent containing by specific ratios a specific resin compound, a specific cationic urethane resin emulsion, a silane coupling agent having a specific functional group, a specific organic Ti chelate compound, a quadrivalent vanadyl compound, and a molybdic acid compound; and a coating film formed of the surface treatment agent after storage can still exhibit such good characteristics as described above. The present invention has been completed based on these discoveries and primary features thereof are as follows.

1. A surface treatment agent for a zinc or zinc alloy coated steel sheet, comprising:
   (A) resin compound having a bisphenol skeleton represented by general formula (I) below;
   (B) cationic urethane resin emulsion having at least one type of cationic functional group selected from primary amine, secondary amine, tertiary amine and quaternary ammonium salt;
   (C) at least one type of silane coupling agent having at least one type of reactive functional group selected from active hydrogen-containing amino group, epoxy group, mercapto group and methacryloxy group;
   (D) organic titanium chelate compound;
   (E) quadrivalent vanadyl compound;
   (F) molybdic acid compound; and
   (G) water, such that conditions (1) to (5) below are satisfied, pH of the surface treatment agent being in the range of 4 to 5,
   wherein: (1) $[(B_s)/\{(A_s)+(B_s)+(C_s)\}]$ as a mass ratio of solid content $(B_s)$ of the cationic urethane resin emulsion (B) with respect to total solid content $\{(A_s)+(B_s)+(C_s)\}$ of the resin compound (A), the cationic urethane resin emulsion (B) and the silane coupling agent (C) is in the range of 0.1 to 0.3;
   (2) $[(C_s)/\{(A_s)+(B_s)+(C_s)\}]$ as a mass ratio of solid content $(C_s)$ of the silane coupling agent (C) with respect to total solid content $\{(A_s)+(B_s)+(C_s)\}$ of the resin compound (A), the cationic urethane resin emulsion (B) and the silane coupling agent (C) is in the range of 0.6 to 0.85;
   (3) $\{(C_s)/(D_{Ti})\}$ as a mass ratio of solid content $(C_s)$ of the silane coupling agent (C) with respect to mass content $(D_{Ti})$ in terms of titanium of the organic titanium chelate compound (D) is in the range of 50 to 70;
   (4) $\{(E_V)/(D_{Ti})\}$ as a mass ratio of mass content $(E_V)$ in terms of vanadium of the quadrivalent vanadyl compound (E) with respect to mass content $(D_{Ti})$ in terms of titanium of the organic titanium chelate compound (D) is in the range of 0.3 to 0.5;
   (5) $[(F_{Mo})/\{(A_s)+(B_s)+(C_s)\}]$ as a mass ratio of mass content $(F_{Mo})$ in terms of molybdenum of the molybdic acid compound (F) with respect to total solid content $\{(A_s)+(B_s)+(C_s)\}$ of the resin compound (A), the cationic urethane resin emulsion (B) and the silane coupling agent (C) is in the range of 0.003 to 0.03.

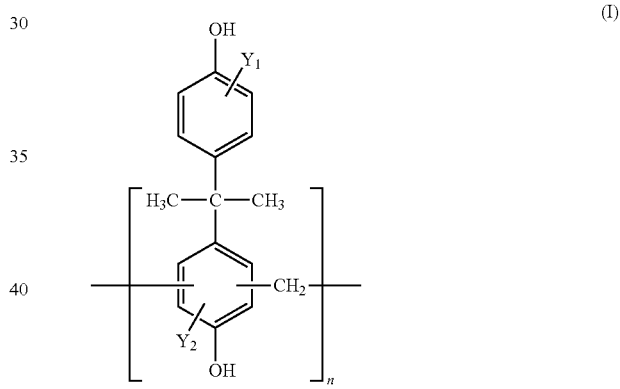

(I)

In formula (I), $Y_1$ and $Y_2$ bonded to benzene rings, respectively, are each independently hydrogen or group z represented by general formula (II) or (III) below, the average substitution number of the group z per benzene ring is in the range of 0.2 to 1.0, and n represents integer in the range of 2 to 50.

(II)

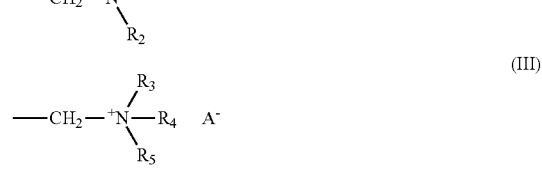

(III)

In formula (II) and formula (III), $R_1$, $R_2$, $R_3$, $R_4$ and $R_5$ each independently represent hydrogen atom, $C_{1-10}$ alkyl group or $C_{1-10}$ hydroxyalkyl group, and $A^-$ represents hydroxyl ion or acid ion.

2. The surface treatment agent for a zinc or zinc alloy coated steel sheet of (1) above, further comprising (W) wax, wherein $[(W_s)/\{(A_s)+(B_s)\}]$ as a mass ratio of solid content $(W_s)$ of the wax (W) with respect to total solid content $\{(A_s)+(B_s)\}$ of the resin compound (A) and the cationic urethane resin emulsion (B) is in the range of 0.2 to 0.4.

3. A method for manufacturing a zinc or zinc alloy coated steel sheet, comprising:

coating a surface of a zinc or zinc alloy coated steel sheet with the surface treatment agent of (1) or (2) above; and drying the zinc or zinc alloy coated steel sheet thus coated such that the peak temperature of the steel sheet is in the range of 50° C. to 180° C. to form a surface treatment film on the surface, wherein a film coating weight of the surface treatment film per one surface after the drying process is in the range of 0.2 g/m² to 1.8 g/m².

4. A zinc or zinc alloy coated steel sheet, having a surface treatment film provided thereon such that a film coating weight of the coating film per one surface of the steel sheet is in the range of 0.2 g/m² to 1.8 g/m², wherein the surface treatment film is obtainable by coating a surface of the zinc or zinc alloy coated steel sheet with the surface treatment agent of (1) or (2) above and drying the zinc or zinc alloy coated steel sheet thus coated such that the peak temperature of the steel sheet is in the range of 50° C. to 180° C.

Effect of the Invention

According to the present invention, it is possible to form on a zinc or zinc alloy coated steel sheet a chromium-free coating film having corrosion resistance equivalent to that of a chromate conversion coating and exhibiting excellent performances in corrosion resistance at a bending-processed of the steel sheet, solvent resistance, paintability after alkali degreasing, and anti-black patina properties during the manufacturing process, thereby making it possible to obtain a chromium-free zinc or zinc alloy coated steel sheet which is much more useful than the conventional zinc or zinc alloy coated steel sheet. Further, the surface treatment agent for a chromium-free zinc or zinc alloy coated steel sheet of the present invention is very advantageous in terms of industrial implementation because of good stability in storage thereof.

BEST MODE FOR CARRYING OUT THE INVENTION

The present invention will be described in detail hereinafter.

A steel sheet serving as a base of the surface treated steel sheet of the present invention is a zinc or zinc alloy coated steel sheet manufactured from a cold rolled steel sheet for use in consumer electric appliances, building materials and automobile parts. Examples of such a zinc or zinc alloy coated steel sheet include: an electrolytic zinc-coated steel sheet, a hot dip galvanized steel sheet, a Zn—Al alloy coated steel sheet, a Zn—Fe alloy coated steel sheet, a Zn—Mg alloy coated steel sheet, a Zn—Al—Mg alloy coated steel sheet, and the like.

Further, it is acceptable to add small amounts of Ni, Co and the like to coating of the zinc or zinc alloy coated steel sheet or make Ni, Co and Fe be precipitated at a surface of the zinc or zinc alloy coated steel sheet by using an acidic or alkali aqueous solution containing Ni, Co, Fe in order to improve anti-black patina properties of the zinc or zinc alloy coated steel sheet.

Highly improved anti-black patina properties can be stably obtained by inclusion of 0.01-0.1 mass % nickel in a coating film in a Zn—Al alloy coated steel sheet and a Zn—Al—Mg alloy coated steel sheet in particular which are susceptible to black patina.

Next, the surface treatment agent of the present invention will be described hereinafter.

The surface treatment agent of the present invention is characterized in that it comprises: (A) resin compound represented by general formula (I) below; (B) cationic urethane resin emulsion; (C) at least one type of silane coupling agent having at least one type of reactive functional group selected from active hydrogen-containing amino group, epoxy group, mercapto group and methacryloxy group; (D) organic titanium chelate compound; (E) quadrivalent vanadyl compound; (F) molybdic acid compound; and (G) water, wherein: (1) $[(B_s)/\{(A_s)+(B_s)+(C_s)\}]$ as a mass ratio of solid content $(B_s)$ of the cationic urethane resin emulsion (B) with respect to total solid content $\{(A_s)+(B_s)+(C_s)\}$ of the resin compound (A), the cationic urethane resin emulsion (B) and the silane coupling agent (C) is in the range of 0.1 to 0.3; (2) $[(C_s)/\{(A_s)+(B_s)+(C_s)\}]$ as a mass ratio of solid content $(C_s)$ of the silane coupling agent (C) with respect to total solid content $\{(A_s)+(B_s)+(C_s)\}$ of the resin compound (A), the cationic urethane resin emulsion (B) and the silane coupling agent (C) is in the range of 0.6 to 0.85; (3) $\{(C_s)/(D_{Ti})\}$ as a mass ratio of solid content $(C_s)$ of the silane coupling agent (C) with respect to mass content $(D_{Ti})$ in terms of titanium of the organic titanium chelate compound (D) is in the range of 50 to 70; (4) $\{(E_V)/(D_{Ti})\}$ as a mass ratio of mass content $(E_V)$ in terms of vanadium of the quadrivalent vanadyl compound (E) with respect to mass content $(D_{Ti})$ in terms of titanium of the organic titanium chelate compound (D) is in the range of 0.3 to 0.5; (5) $[(F_{Mo})/\{(A_s)+(B_s)+(C_s)\}]$ as a mass ratio of mass content $(F_{Mo})$ in terms of molybdenum of the molybdic acid compound (F) with respect to total solid content $\{(A_s)+(B_s)+(C_s)\}$ of the resin compound (A), the cationic urethane resin emulsion (B) and the silane coupling agent (C) is in the range of 0.003 to 0.03; and pH of the surface treatment agent is in the range of 4 to 5.

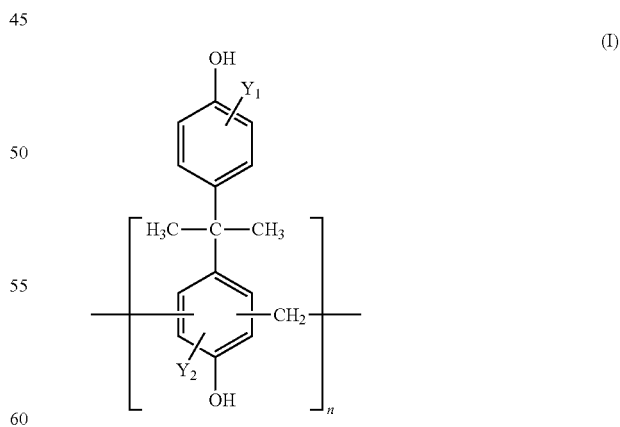

In formula (I), $Y_1$ and $Y_2$ bonded to benzene rings, respectively, are each independently hydrogen or group z represented by general formula (II) or (III) below, the average substitution number of the group z per benzene ring is in the range of 0.2 to 1.0, and n represents integer in the range of 2 to 50.

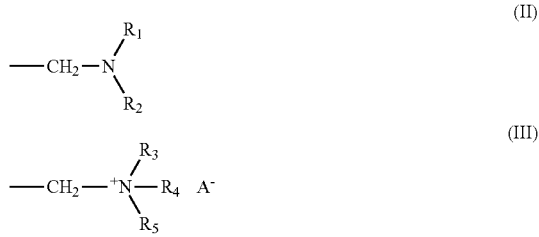

In formula (II) and formula (III), $R_1$, $R_2$, $R_3$, $R_4$ and $R_5$ each independently represent hydrogen atom, $C_{1-10}$ alkyl group or $C_{1-10}$ hydroxyalkyl group. The resin compound (A) cannot have sufficient water-solubility and is unstable in treatment liquid, whereby the resin compound is not applicable to the treatment liquid, when the alkyl group or hydroxyalkyl group of formula (II) and formula (III) have more than ten carbon atoms. Specific examples of $R_1$, $R_2$, $R_3$, $R_4$ and $R_5$ include methyl, ethyl, propyl, butyl, hydroxyethyl, 2-hydroxypropyl, hydroxyisobutyl, and the like. $A^-$ represents hydroxyl ion or acid ion. Specific examples of the acid ion include acetate ion, phosphate ion, formate ion and the like.

The "average substitution number of the group z" represents a value obtained by dividing the total number of the group z introduced into the total benzene rings by the number of the total benzene rings, i.e. 2n, in the present invention. In the present invention, solubility of the resin compound (A) with respect to the acidic (pH 4 to 5) surface treatment agent targeted by the present invention improves in terms of stability when the group z is selected as $Y_1$ and $Y_2$ because then the resin compound (A) includes any of secondary amine, tertiary amine and quaternary ammonium salts as cationic functional groups. The number average degree of polymerization (n) is to be in the range of 2 to 50 in the present invention. The number average degree of polymerization (n) less than 2 results in an insufficient corrosion resistance-imparting effect, while n exceeding 50 deteriorates water-solubility and increases viscosity of the resin compound (A) in a treatment liquid, thereby deteriorating stability of the resin compound (A) in the treatment liquid and thus rendering storage stability thereof unsatisfactory.

The resin compound (A) represented by general formula (I) is a bisphenol-formalin condensate and a synthesis method thereof is not particularly restricted. Such a condensate as described above can be obtained, for example, by reacting bisphenol A with formalin and amine(s) under alkali catalyst.

The cationic urethane resin emulsion (B) having a cationic functional group, in the surface treatment agent composition of the present invention, is not particularly restricted in terms of polyol and isocyanate components as monomer components and the polymerization method thereof as long as the urethane resin emulsion (B) has at least one type of cationic functional group selected from primary amine, secondary amine, tertiary amine and quaternary ammonium salts. Examples of the cationic functional group include amino group, methylamino group, ethylamino group, dimethylamino group, diethylamino group, trimethylamino group, triethylamino group, and the like but not particularly restricted as long as the cationic functional group is selected from primary amine, secondary amine, tertiary amine and quaternary ammonium salts.

The silane coupling agent (C) in the surface treatment agent of the present invention is not particularly restricted as long as the silane coupling agent (C) is at least one type of silane coupling agent having at least one type of reactive functional group selected from active hydrogen-containing amino group, epoxy group, mercapto group and methacryloxy group. Trialkoxysilane having three alkoxy groups is particularly preferable. Specific examples of the silane coupling agent (C) include N-(aminoethyl)-3-aminopropyltrimethoxysilane, N-(2-aminoethyl)-3-aminopropyltrimethoxysilane, 3-aminopropyltrimethoxysilane, 3-glycidoxypropyltrimethoxysilane, 3-glycidoxypropylmethyldimethoxysilane, 3-methacryloxypropyltrimethoxysilane, 2-(3,4-epoxycyclohexyl)ethyltriethoxysilane, 3-mercaptopropyltrimethoxysilane, 3-mercaptopropyltriethoxysilane, and the like.

Examples of the organic titanium chelate compound (D) in the surface treatment agent of the present invention include titanium acetylacetonato, titanium octyleneglycolate, titanium tetraacetylacetonato, titanium tetraacetylacetenato, titanium ethylacetoacetate and the like. Inorganic titanium salts such as titanium nitrate, titanium sulfate, titanium acetate, titanium phosphate, titanium carbonate are not preferable because these inorganic salts are not stably dissolved in the treatment liquid of the present invention or fail to sufficiently cause a corrosion resistance improving effect. Fluorotitanic acid causes a good effect when it is provided, in addition to the organic titanium chelate compound, to the treatment liquid of the present invention. When fluorotitanic acid is used in combination with the organic titanium chelate compound, the former is preferably blended such that fluorine content in the treatment liquid is 0.8 mass % or less with respect to total solid content $\{(A_s)+(B_s)+(C_s)\}$ of the resin compound (A), the cationic urethane resin emulsion (B) and the silane coupling agent (C). The fluorine content in the treatment liquid, when it exceeds 0.8 mass %, may deteriorate corrosion resistance at a processed portion of a steel sheet. In a case where the organic titanium chelate compound is used in a water-dissolved state where titanium is dissolved as chelate complex in water, it is preferable not to add a water-soluble solvent, peroxide, and the like having high polarity, which may affect the titanium complex, to the treatment liquid of the present invention.

Specific examples of the quadrivalent vanadyl compound (E) for use in the surface treatment agent of the present invention, with no particular restriction thereto, include vanadyl sulfate, vanadyl dichloride, vanadyl phosphate, vanadyl oxalate, vanadyl acetylacetonate, and the like. A pentavalent vanadium compound is highly water soluble and exceedingly dissolved from surface treatment film, thereby causing a poor effect of improving corrosion resistance. A vanadyl compound producing $VO^{2+}$ (vanadyl) ion exhibits the highest corrosion resistance improving effect and thus the most preferable among the quadrivalent vanadyl compounds for use in the surface treatment agent of the present invention.

The present invention characteristically adds the molybdic acid compound (F) as a component of improving anti-black patina property to the surface treatment agent thereof. Specific examples of the molybdic acid compound (F), with no particular restriction thereto, include molybdic acid, ammonium molybdate, sodium molybdate, potassium molybdate, magnesium molybdate, zinc molybdate, as well as phosphomolybdic acid, ammonium phosphomolybdate, sodium phosphomolybdate, and the like. At least one type of molybdic acid compound selected from the aforementioned examples is preferably used as the molybdic acid compound (F) in the present invention.

A mass ratio $[(B_s)/\{(A_s)+(B_s)+(C_s)\}]$ of solid content $(B_s)$ of the cationic urethane resin emulsion (B) with respect to total solid content $\{(A_s)+(B_s)+(C_s)\}$ of the resin compound (A), the cationic urethane resin emulsion (B) and the silane coupling agent (C) is to be in the range of 0.1 to 0.3 in the surface treatment agent of the present invention. The mass ratio $[(B_s)/\{(A_s)+(B_s)+(C_s)\}]$ lower than 0.1 results in deterioration of corrosion resistance at a bending-processed portion and heat resistance of a steel sheet, as well as deterioration of stability in storage of the surface treatment agent, due to too low ratio of the urethane resin. On the other hand, the mass ratio $[(B_s)/\{(A_s)+(B_s)+(C_s)\}]$ exceeding 0.3 results in poor solvent resistance. The mass ratio $[(B_s)/\{(A_s)+(B_s)+(C_s)\}]$ is preferably in the range of 0.12 to 0.28.

A mass ratio $[(C_s)/\{(A_s)+(B_s)+(C_s)\}]$ of solid content $(C_s)$ of the silane coupling agent (C) with respect to total solid content $\{(A_s)+(B_s)+(C_s)\}$ of the resin compound (A), the cationic urethane resin emulsion (B) and the silane coupling agent (C) is to be in the range of 0.6 to 0.85 in the surface treatment agent of the present invention. The mass ratio $[(C_s)/\{(A_s)+(B_s)+(C_s)\}]$ lower than 0.6 deteriorates solvent resistance of the surface treatment agent, while the mass ratio $[(C_s)/\{(A_s)+(B_s)+(C_s)\}]$ exceeding 0.85 results in deterioration of corrosion resistance at a processed portion of a steel sheet and stability in storage of the surface treatment agent. Accordingly, the mass ratio $[(C_s)/\{(A_s)+(B_s)+(C_s)\}]$ is preferably in the range of 0.65 to 0.80.

A mass ratio $\{(C_s)/(D_{Ti})\}$ of solid content $(C_s)$ of the silane coupling agent (C) with respect to mass content $(D_{Ti})$ in terms of titanium of the organic titanium chelate compound (D) is to be in the range of 50 to 70 in the surface treatment agent of the present invention. The mass ratio $\{(C_s)/(D_{Ti})\}$ lower than 50 results in poor corrosion resistance at a processed portion of a steel sheet and poor storage stability of the surface treatment agent. The mass ratio $\{(C_s)/(D_{Ti})\}$ exceeding 70 accelerates dissolution of surface treatment film, as well as deteriorating paintability after degreasing, of resulting surface treatment film. Accordingly, the mass ratio $\{(C_s)/(D_{Ti})\}$ is more preferably in the range of 55 to 65.

Solid content $(C_s)$ of the silane coupling agent (C) is to be obtained as a mass of the silane coupling agent in a state where alkoxysilane $(R-Si(-OR_1)_3)$ thereof has been rendered to silanol $(R-Si(-OH)_3)$ as a result of hydrolysis in calculation of mass ratios in the present invention. This is because most of the silane coupling agent is hydrolyzed when it is dissolved in water and alcohol, generated as a result of the hydrolysis, is evaporated and does not function as an effective component when the surface treatment agent of the present invention is coated and dried to form a coating film.

A mass ratio $\{(E_V)/(D_{Ti})\}$ of mass content $(E_V)$ in terms of vanadium of the quadrivalent vanadyl compound (E) with respect to mass content $(D_{Ti})$ in terms of titanium of the organic titanium chelate compound (D) is to be in the range of 0.3 to 0.5 in the surface treatment agent of the present invention. The mass ratio $\{(E_V)/(D_{Ti})\}$ lower than 0.3 results in poor corrosion resistance, while the mass ratio $\{(E_V)/(D_{Ti})\}$ exceeding 0.5 deteriorates paintability after alkali degreasing, of the resulting surface treatment film. Accordingly, the mass ratio $\{(E_V)/(D_{Ti})\}$ is preferably in the range of 0.35 to 0.48.

A mass ratio $[(F_{Mo})/\{(A_s)+(B_s)+(C_s)\}]$ of mass content $(F_{Mo})$ in terms of molybdenum of the molybdic acid compound (F) with respect to total solid content $\{(A_s)+(B_s)+(C_s)\}$ of the resin compound (A), the cationic urethane resin emulsion (B) and the silane coupling agent (C) is to be in the range of 0.003 to 0.03 in the surface treatment agent of the present invention. The mass ratio $[(F_{Mo})/\{(A_s)+(B_s)+(C_s)\}]$ lower than 0.003 results in poor anti-black patina property, while the mass ratio $[(F_{Mo})/\{(A)+(B_s)+(C_s)\}]$ exceeding 0.03 not only makes it impossible to achieve good storage stability of the surface treatment agent but also possibly causes gelling of the surface treatment agent. The mass ratio $[(F_{Mo})/\{(A_s)+(B_s)+(C_s)\}]$ is preferably at least 0.006 to obtain satisfactory anti-black patina property of the resulting steel sheet product.

The pH value of the surface treatment agent of the present invention is to be in the range of 4 to 5. The pH value lower than 4 accelerates dissolution of zinc from a coating layer of the zinc or zinc alloy coated steel sheet subjected to surface treatment with the surface treatment agent, thereby deteriorating corrosion resistance of the steel sheet. The pH value exceeding 5 makes the quality of the surface treatment agent unstable. Preferable examples of an acid component to be used when pH of the surface treatment agent is adjusted to 4 to 5 include phosphoric acid, acetic acid, formic acid, hydrofluoric acid, fluorides and the like. A strong acid such as sulfuric acid, nitric acid is not preferable. Use of sulfuric acid, nitric acid or the like possibly causes "pH shock" (localized and rapid change in pH value) to occur in pH value adjustment, which results in gelling of cationic phenol and cationic urethane in the surface treatment agent, exceeding dissolution of salts formed in connection with the gelling and eventual deterioration of corrosion resistance of a steel sheet. Acetic acid and formic acid are preferable in terms of pH adjustment firstly because they are weak acids and secondly because these acids, which are highly volatile, evaporate when the chemical components of the present invention are dried and not so much of them remain in the coating film after all, thereby not causing so much adverse effects on the performances of the resulting surface treatment film in case these acids are added too much.

In a case where phosphoric acid is used in pH value adjustment, phosphoric acid is preferably added such that content thereof is 8 mass % or less with respect to the total solid content of the resin compound (A), the cationic urethane resin emulsion (B) and the silane coupling agent (C). Although phosphoric acid improves corrosion resistance, the content thereof exceeding 8 mass % may deteriorate storage stability of the surface treatment agent. Content of phosphoric acid is more preferably 6 mass % or less with respect to the total solid content of the resin compound (A), the cationic urethane resin emulsion (B) and the silane coupling agent (C). In a case hydrofluoric acid or a fluoride is used in pH value adjustment, hydrofluoric acid or a fluoride is blended such that fluorine content is preferably 0.8 mass % or less with respect to the total solid content of the resin compound (A), the cationic urethane resin emulsion (B) and the silane coupling agent (C). The aforementioned fluorine content exceeding 0.8 mass % enhances etching capacity of the surface treatment agent with respect to zinc or zinc alloy coating too much and deteriorates corrosion resistance at a processed portion of a steel sheet. As an alkali component for use in pH value adjustment to 4 to 5, ammonia water or amine having boiling point of 100° C. or lower is preferable. Use of a strong alkali such as NaOH, KOH results in formation of gel due to pH shock and deterioration of storage stability of the surface treatment agent.

The surface treatment agent of the present invention may further contain wax (W) in order to ensure good lubrication of coating film. The wax (W) is preferably blended such that a mass ratio $[(W_s)/\{(A_s)+(B_s)\}]$ of solid content $(W_s)$ of the wax (W) with respect to total solid content $\{(A_s)+(B_s)\}$ of the resin compound (A) and the cationic urethane resin emulsion (B) is in the range of 0.2 to 0.4. The mass ratio $[(W_s)/\{(A_s)+(B_s)\}]$ equal to or higher than 0.2 ensures desired lubrication of coating film and the mass ratio $[(W_s)/\{(A_s)+(B_s)\}]$ of 0.4 or less makes good lubrication compatible with good cost performance without deteriorating corrosion resistance. It is particularly preferable to set the mass ratio $[(W_s)/\{(A_s)+(B_s)\}]$ to be in the range of 0.3 to 0.4.

At least one type of wax selected from waxes each having melting point in the range of 70° C. to 120° C. is preferable as the wax (W) for use in the present invention. Specific examples of the wax (W) include polyethylene wax, polyethylene oxide wax, polypropylene wax, microcrystalline wax, and the like. Melting point of the wax (W) not lower than 70° C. ensures good lubrication and melting point thereof 120° C. or lower allows a resulting coating film to maintain good lubrication without being hardened too much.

Emulsion stably dispersed in water by an emulsifier is preferable and such water-dispersed emulsion having particle diameter in the range of 0.08 μm to 0.3 μm is particularly preferable as the wax (W). The particle diameter of at least 0.08 μm of the emulsion ensures a good lubricating effect and good alkali resistance and paintability of a resulting coating film are ensured, respectively, because an amount of emulsifier in use can be curbed. The particle diameter of 0.3 μm or less of the emulsion is preferable because then the wax is reliably prevented from floating and being separated in the surface treatment agent due to too small specific gravity of the wax (W), thereby achieving excellent stability in storage.

Water (G) for use in the present invention is preferably that not so much affecting the respective components, i.e. the resin compound (A), the cationic urethane resin emulsion (B), the silane coupling agent (C) and the organic titanium chelate compound (D), and the acid component and the alkali component for use in pH value adjustment. Water hardness components such as Mg, Ca, Si contained as impurities in water, for example, deteriorate solubility and dispersibility of the resin compound (A) and the cationic urethane resin emulsion (B), thereby possibly being factors of facilitating precipitation thereof. Further, Na and Cl contained as impurities in water, when they remain in a resulting coating film, possibly deteriorate corrosion resistance and paint adhesion properties of the coating film. Accordingly, water (G) for use in the present invention preferably contains as few impurities as possible and electrical conductivity thereof, for example, is preferably less than 100 μS/cm, more preferably less than 50 μS/cm and further more preferably less than 10 μS/cm.

The total solid content of the surface treatment agent of the present invention is preferably 4 mass % to 20 mass % as the solid content measured when the surface treatment agent is dried at 110° C. for 2 hours. A targeted film coating weight of the surface treatment film described below is easily ensured and good storage stability of the surface treatment agent can also be obtained by setting the total solid content of the surface treatment agent to be in the range of 4 mass % to 20 mass %.

An antifoaming agent and a wettability-improving agent may optionally be added to the surface treatment agent of the present invention. Types of the antifoaming agent are not particularly restricted and a silicone based or aliphatic acid based emulsion-type antifoaming agent can be used. The wettability-improving agent lowers surface tension of the surface treatment agent, thereby improving wettability of the surface treatment agent with respect to a zinc or zinc alloy coated steel sheet and making the appearance of the steel sheet satisfactorily uniform. Examples of the wettability-improving agent include, with no limitation thereto, an aqueous solvent such as ethanol, T-butanol and butyl cellosolve. A wettability-improving agent containing acetylene is preferable because it also causes a antifoaming effect. A nitrate salt such as nickel nitrate, ammonium nitrate or the like may be added to the surface treatment agent of the present invention in order to improve anti-black patina property. A nitrate salt does not cause pH shock, different from nitric acid which causes pH shock as described above.

Next, a method for manufacturing a coated steel sheet by using the surface treatment agent described above and a coated steel sheet obtained by the method will be described.

When a surface treatment film is to be formed on a coated steel sheet by using the surface treatment agent of the present invention, it is necessary to coat a surface of a coated steel sheet with the surface treatment agent and dry the coated steel sheet thus treated with the surface treatment agent such that the peak temperature of the steel sheet is in the range of 50° C. to 180° C. to form on the surface of the coated steel sheet a surface treatment film at a film coating weight per one surface being in the range of 0.2 g/m² to 1.8 g/m².

In a case where a film coating weight of the surface treatment film per one surface of the coated steel sheet is less than 0.2 g/m², satisfactory corrosion resistance cannot be obtained. In a case where the film coating weight of the surface treatment film exceeds 1.8 g/m², not only the effect caused by the film coating reaches a plateau, which is not only economically disadvantageous, but also paintability of a resulting steel sheet deteriorates. A film coating weight of the surface treatment film per one surface of the coated steel sheet therefore is to be in the range of 0.2 g/m² to 1.8 g/m², preferably in the range of 0.3 g/m² to 1.6 g/m², and more preferably in the range of 0.4 g/m² to 1.4 g/m².

Examples of a method for applying the surface treatment agent of the present invention to a coated steel sheet include roll coating (three roll coating, two roll coating), squeeze coating, die coating, and the like. It is acceptable to adjust a coating quantity or weight of the surface treatment agent and make the appearance and coating film thickness uniform by using air knife or squeezing rolls after the coating process by squeeze coating, the immersing process or the spraying process.

The zinc or zinc alloy coated steel sheet, thus coated or treated with the surface treatment agent of the present invention, is then heated and dried preferably without rinsing after the coating process. Examples of means for drying the steel sheet include a drier, an air-heating furnace, a high frequency induction heating furnace, an infrared furnace, and the like. Drying is carried out such that the peak temperature of the steel sheet itself is in the range of 50° C. to 180° C. The peak temperature lower than 50° C. allows too much moisture to remain in the coating film, which results in insufficient corrosion resistance of the coating film. The peak temperature exceeding 180° C. is not only uneconomical but also makes resulting coating film hard and brittle, which deteriorates corrosion resistance at a processed portion of a steel sheet.

The coated steel sheet having a surface treatment film formed thereon by the aforementioned method of the present invention may be further provided with a resin coating formed by coating on a surface of the surface treatment film in order to obtain further higher corrosion resistance.

A surface treatment film formed by using the surface treatment agent of the present invention may be provided on either one or respective surfaces of a coated steel sheet.

Next, effects caused by the present invention will be described. Although it is reasonably assumed that the respective components cause following effects in the surface treatment agent of the present invention, these assumptions put no restriction on the present invention.

The surface treatment agent of the present invention contains as main components the resin compound (A), the cationic urethane resin emulsion (B), the silane coupling agent (C), which collectively constitute a skeleton of coating film.

The quality of the surface treatment agent is made stable and good stability during storage of the surface treatment agent is ensured by adjusting pH value of the surface treatment agent containing the resin compound (A) having cationic functional groups (represented by aforementioned general formula (II) or general formula (III)) to weak acidity in the present invention. The resin compound (A), due to the cationic functional groups thereof, is prevented from being dissolved into alkali and thus a resulting coating film has good alkali resistance. Further, the resin compound (A), having bisphenol as a phenol skeleton thereof, is well prevented from being dissolved into a polar solvent (i.e. has good solvent resistance), whereby adhesion property and corrosion resistance of resulting coating film improve.

The resin compound (A) described above, however, tends to take on yellowish color by heating (that is, anti-yellowing property of the resin compound (A) deteriorates by heating). Further, the resin compound (A), when it is heated, tends to harden a resulting surface treatment film. In view of these facts, the cationic urethane resin emulsion (B) is blended into the surface treatment agent to mitigate hardness of the phenol resin and ensure good corrosion resistance at a processed portion of a steel sheet in the present invention.

However, the cationic urethane resin emulsion (B) makes a resulting surface treatment film susceptible to a polar solvent to facilitate coming-off of the coating film, while causing such good effects on the resin compound (A) as described above. In view of this, the silane coupling agent (C) is blended into the surface treatment agent in order to ensure good solvent resistance (to a polar solvent) and good anti-yellowing property of the surface treatment agent in the present invention. The silane coupling agent (C) generates active silanol group (Si—OH) as a result of hydrolysis of the terminal alkoxy group thereof, thereby contributing to improving adhesion properties of resulting coating film with respect to the base material (the zinc or zinc alloy coated steel sheet) and the over coating formed thereon. Further, a portion of the silane coupling agent (C) forms siloxane bond (Si—O—Si) as a result of dehydration condensation and continuation of the siloxane bonds constitutes a polymer (polysiloxane: —Si—O—Si—O—Si—). As a result, resulting coating film has a very stable structure, as well as good corrosion resistance, solvent resistance and anti-yellowing property.

It is assumed that the respective performances of resulting surface treatment film can be well demonstrated with good balance therebetween by using the resin compound (A), the cationic urethane resin emulsion (B), the silane coupling agent (C) as the main components at adequate ratios in the surface treatment agent of the present invention. However, a surface treatment agent containing only the aforementioned main components cannot satisfactorily address the prior art problems in particular a black-patina phenomenon described above. The surface treatment agent of the present invention thus further contains as an essential component the organic titanium chelate compound (D) in addition to the aforementioned main components to solve the prior art problems. The organic titanium chelate compound (D) presumably functions as a catalyst for facilitating formation of polysiloxane when the surface treatment agent is dried to form coating film. As a result of contribution made by the organic titanium chelate compound (D), alkali resistance of resulting coating film remarkably improves to enhance corrosion resistance after alkali degreasing; and solvent resistance and paintability, of the resulting surface treatment film, also improve.

A predetermined content of the organic titanium chelate compound (D), which content is determined in accordance with the content of the silane coupling agent (C), is required in order to obtain the aforementioned good effects of the organic titanium chelate compound (D), as described above. Too low content of the organic titanium chelate compound (D) fails to achieve the desired effects and too high content thereof results in excess formation of polysiloxane, which results in hard and brittle coating film and poor corrosion resistance at a processed portion of a steel sheet. It should be noted that formation of polysiloxane by the organic titanium chelate compound (D) already proceeds during a storage period of the surface treatment agent, although such formation of polysiloxane should ideally start when coating film is formed. Therefore, too much content of the organic titanium chelate compound (D) deteriorates storage stability (i.e. disturbs good suppression of increase in viscosity and gelling), making it impossible to maintain the same quality of the surface treatment agent before, during and after the storage thereof.

The surface treatment agent of the present invention contains as an essential component the quadrivalent vanadyl compound (E). The quadrivalent vanadyl compound (E) presumably functions as a corrosion inhibitor through, for example, passivation of zinc. It is assumed that vanadyl [$VO^{2+}$] ion having one oxygen in particular, which does not easily elute even under a humid environment, causes a good inhibitor effect while continuing to stay within coating film, thereby reliably improving: corrosion resistance at a portion of a coated steel sheet where surface treatment film or zinc or zinc alloy coated surface itself has suffered from ductile damage due to an strong impact such as bending operation; and corrosion resistance after alkali degreasing. The inventors of the present invention assume that such good effects by the quadrivalent vanadyl compound (E) are achieved, when a coating film skeleton having the cationic functional groups has been adequately formed, by a synergetic effect caused by the quadrivalent vanadyl compound (E) and Ti, which also exists as a cation.

The surface treatment agent of the present invention further contains the molybdic acid compound (F) as an essential component. Excellent anti-black patina property can be obtained by addition of the molybdic acid compound (F) in the present invention. Black patina of zinc or zinc alloy coating occurs regardless of coating type (electrolytic coating; galvanizing). In the case of hot dip galvanizing in particular, Mg and/or Al is generally added in order to improve corrosion resistance or adhesion between zinc coating and a base material (an iron sheet), which Mg and/or Al migrates to a coating interface or a coating surface layer of the zinc coating to facilitate occurrence of black patina and worsen blackening. Further, it is known that anti-black patina property of coating film deteriorates when the coating film is subjected to surface treatment for improving anti-white rust property of zinc or zinc alloy coating.

The reason for why zinc or zinc alloy coating is blackened under a high-temperature and high-humid environment has not been revealed yet. It is assumed that zinc oxide generated at the outermost surface of zinc or zinc alloy coating is depleted of oxygen and converted into oxygen-depleted type zinc oxide, or oxygen-depleted type zinc oxide is generated due to insufficient oxygen supply during zinc corrosion (oxidizing) process, which oxygen-depleted type zinc oxide probably contributes to the black appearance of the zinc or zinc alloy coating.

Excellent anti-black patina property is obtained by introducing a molybdic acid compound into surface treatment film in the present invention. Specifically, it is assumed that a portion of molybdic acid ($MoO_4^{2-}$) is converted into molybdic oxide ($MoO_3$) under a high-temperature and high-humid or corroding environment and the oxygen derived from this reduction process is supplied to a zinc coating surface in an adequate manner to well suppress formation of oxygen-depleted type zinc oxide. The inventors of the present invention assume that such a mechanism as described above contributes to eventually obtaining surface treatment film having good anti-black patina property.

EXAMPLES

Each of respective surface treatment agent samples No. 1-95 was prepared by appropriately mixing the resin compound (A) shown in Table 1a or Table 1b, the cationic urethane resin emulsion (B) shown in Table 2, the silane coupling agent (C) shown in Table 3, the titanium compound (D) shown in Table 4, the vanadium compound (E) shown in Table 5, the molybdic acid compound (F) shown in Table 6, and the wax (W) emulsion shown in Table 7. Further, coated steel sheets as shown in Table 8 were used as original steel sheets to be treated.

Specifically, each of the respective surface treatment agent samples of Examples and Comparative Examples was prepared by: blending the components (A)-(W) so as to have a corresponding composition shown in Tables 9-1, 10-1 and 11-1; adjusting a pH value to that corresponding thereto shown in Tables 9-2, 10-2 and 11-2, with acetic acid and ammonium; and adjusting with ion-exchange water solid content thereof as solid content after being dried at 110° C. for 2 hours to be 10 mass %. Ion-exchange water having electrical conductivity of 10 μs/cm was uses as the ion-exchange water.

Surfaces of respective coated steel sheets shown in Tables 12-1 and 12-2 were subjected to alkali degreasing, rinsing and drying. One surface of each of the coated steel sheets thus treated was coated with the corresponding surface treatment agent shown in Tables 9-1, 9-2, 10-1, 10-2, 11-1 and 11-2 by roll coating. Each of the steel sheets was then heated and dried, without rinsing after the coating process, such that the peak temperature of the steel sheet reached the corresponding temperature shown in Tables 12-1 and 12-2, whereby a coated steel sheet sample having surface treatment film thereon was produced. A film coating weight of the surface treatment film per one surface of each coated steel sheet sample was adjusted by changing coating conditions (i.e. reduction force, rotating speed and the like of rolls). Tables 12-1 and 12-2 show respective film coating weights of the respective coated steel sheet product samples thus obtained.

A film coating weight of surface treatment film was determined by quantitatively analyzing Si of the silane coupling agent (C) contained in the surface treatment film by a fluorescence x-ray analyzer and carrying out necessary calculation for converting the Si content into the film coating weight.

Tests for analyzing qualities (corrosion resistance of a flat surface portion, corrosion resistance at bending-processed portion, corrosion resistance after alkali degreasing, anti-black patina property, heat discoloration resistance, paintability, paintability after alkali degreasing, solvent resistance, stability in storage, lubricity) of each surface treatment agent sample and each zinc or zinc alloy coated steel sheet sample manufactured by using the surface treatment agent sample were carried out. The results are shown in Tables 13-1, 13-2 and 13-3. Performances of the aforementioned qualities were evaluated under following conditions.

(1) Corrosion Resistance to a Flat Surface Portion

Corrosion resistance of a flat surface portion was evaluated for each coated steel sheet product sample by a salt spray test (JIS-Z-2371-2000), according to a white rust generation area ratio after 120 hours after the spray. The evaluation criteria are as follows.

| ⊚ | White rust generation area ratio | 0% |
|---|---|---|
| ○+ | White rust generation area ratio | 0%-5% (exclusive of 0% and 5%) |
| ○ | White rust generation area ratio | 5%-10% (inclusive of 5% and exclusive of 10%) |
| ○- | White rust generation area ratio | 10%-20% (inclusive of 10% and exclusive of 20%) |
| Δ | White rust generation area ratio | 20%-40% (inclusive of 20% and exclusive of 40%) |
| X | White rust generation area ratio | 40% or higher |

(2) Corrosion Resistance at Bending-Processed Portion

Corrosion resistance at a bending-processed portion was evaluated for each coated steel sheet product sample by: bending the sample at 180° around a rod having diameter of 2 mm (made of stainless) interposed between respective sides; clamping the sample in a vise; subjected the sample thus bent to a salt spray test (JIS-Z-2371-2000) to analyze a white rust generation state 72 hours after the spray on the outer side of the bending-processed portion of the sample and evaluate the state according to a white rust generation area ratio. The evaluation criteria are as follows.

⊚: No generation of rust at the bending-processed portion
○+: White rust generation area ratio at the bending-processed portion was less than 5%
○: White rust generation area ratio at the bending-processed portion was 5%-10% (inclusive of 5% and exclusive of 10%)
○-: White rust generation area ratio at the bending-processed portion was 10%-40% (inclusive of 10% and exclusive of 40%)
Δ: White rust generation area ratio at the bending-processed portion was 40%-80% (inclusive of 40% and exclusive of 80%)
x: White rust generation area ratio at the bending-processed portion was 80% or higher (3) Corrosion Resistance after Alkali Degreasing Corrosion resistance after alkali degreasing was evaluated for each coated steel sheet product sample by: dissolving an alkali degreasing agent CL-N364S (manufactured by Nihon Parkerizing Co., Ltd.) in pure water at concentration of 20 g/L and heating the solution at 60° C.; immersing the sample in the alkali solution thus prepared for two minutes, then taking the sample out of the solution, rinsing and drying the sample; and subjecting the sample to a salt spray test (JIS-Z-2371-2000) to evaluate a white rust generation state 72 hours after the spray according to a white rust generation area ratio. The evaluation criteria are the same as those shown in (1) above.

(4) Anti-Black Patina Property

Anti-black patina property was evaluated for each coated steel sheet product sample by: measuring brightness (L-value) of the sample before the test; leaving the sample in a thermo-hygrostat, of which atmosphere was controlled to have temperature: 80° C., relative humidity: 95%, for 24 hours; measuring brightness (L-value) of the sample; and calculating change in brightness (L-value), i.e. ΔL=(the L-value after the test)−(the L-value prior to the test). The evaluation criteria are as follows. Measurement of L-values was carried out in SCE mode (specular component excluded) by using "SR2000" manufactured by Nippon Denshoku Industries Co., Ltd.

◎: −6≤ΔL
○: −10≤ΔL<−6
Δ: −14≤ΔL<−10
x: ΔL<−14

(5) Heat Discoloration Resistance

Heat discoloration resistance was evaluated for each coated steel sheet product sample by: heating the sample in an IR image furnace for 30 seconds at the steel sheet temperature: 500° C.; retaining the steel sheet for 30 seconds at 500° C.; taking the sample out of the IR image furnace and leaving the sample to allow it to be naturally cooled to the room temperature; and visually observing the surface appearance of the sample when it was cooled. The evaluation criteria are as follows.

◎: No color change
○: Very slightly brownish
Δ: Discolored to pale brown
x: Discolored to brown (6) Paintability Paintability was evaluated for each coated steel sheet product sample by: coating the sample with "DELI-CON®#700" (melaminealkyd paint manufactured by DAI NIPPON TORYO Co., Ltd.); baking the sample at 130° C. for 30 minutes to form on the coated steel sheet a paint coating film having film thickness of 30 μm; immersing the sample in boiling water for 2 hours; taking the sample out of the boiling water and immediately cutting the paint coating film in a lattice-like pattern (10 lines×10 lines, 1 mm interval between lines) such that the cutting reached the surface of the base steel sheet; subjecting the sample thus cut to 5 mm extrusion processing by an Erichsen cupping testing machine, with the cut portion of the sample placed on the outer side; carrying out adhesion and peeling with adhesive tape for the sample; and measuring a peeled area of the paint coating film. The evaluation criteria are as follows. The Erichsen cupping test conditions were those according to JIS-Z-2247-2006 and punch diameter: 20 mm, die diameter: 27 mm, and width of drawing: 27 mm.

| ◎ | No peeling | (Peeled area ratio = 0%) |
|---|---|---|
| ○+ | Peeled area ratio | 0%-3% (exclusive of 0% and 3%) |
| ○ | Peeled area ratio | 3%-10% (inclusive of 3% and exclusive of 10%) |
| ○− | Peeled area ratio | 10%-20% (inclusive of 10% and exclusive of 20%) |
| Δ | Peeled area ratio | 20%-50% (inclusive of 20% and exclusive of 50%) |
| X | Peeled area ratio | 50% or higher |

(7) Paintability after Alkali Degreasing

Paintability after alkali degreasing was evaluated for each coated steel sheet product sample by subjecting the sample to the same alkali degreasing as in (3) above and then the same test for evaluating paintability as in (6) above. The evaluation criteria were the same as those in (6) above.

(8) Solvent Resistance

Solvent resistance was evaluated for each coated steel sheet product sample by: applying a piece of gauze soaked with methanol on a surface of the sample and exerting load of 4.90 N (500 gf) on the gauze; rubbing the sample surface with the gauze ten times reciprocally with the load exerted thereon; evaluating visually the scars resulted from the rubbing. The evaluation criteria are as follows.

◎: No scars
○+: Scars were slightly observed when viewed diagonally but not observed when viewed from the top.
○: Scars were clearly observed when viewed diagonally but not observed when viewed from the top.
○−: Scars were slightly observed when viewed from the top.
Δ: Scars were clearly observed when viewed from the top.
x: Surface treatment film peeled off.

(9) Stability in Storage

Stability in storage of each of the surface treatment agent samples shown in Tables 9-1, 9-2, 10-1, 10-2, 11-1 and 11-2 was evaluated by storing the sample in a thermostat chamber at 40° C. for 30 days, then taking the sample out of the chamber and visually analyzing the appearance of the sample for evaluation. The evaluation criteria are as follows. Further, coated steel sheet samples each having surface treatment film formed thereon were prepared by using the surface treatment agent samples thus stored under the aforementioned conditions, respectively. The coated steel sheet samples thus prepared were subjected to the same tests as described in connection with (1), (2) and (3) above.

◎: No change
○: Very small amount of precipitation was observed.
Δ: Small amount of precipitation was observed or viscosity slightly increased.
x: Large amount of precipitation was observed or gelling occurred.

(10) Lubricity

Lubricity was evaluated for each coated steel sheet sample by: cutting a disc-shaped test piece (diameter: 100 mm) out of the sample; molding the test piece into a cup-like shape under the conditions of punch diameter: 50 mm, die diameter: 51.91 mm, fold pressure: 1 t; visually analyzing the appearance of the drawing-processed surface of the test piece thus molded (i.e. the appearance of the external surface of the side of the cup); and evaluating degree of scars and degree of blackening of the surface of the test piece. The evaluation criteria are as follows.

◎: Substantially no change at the entire surface, with uniform appearance
○+: Very low degree of blackening, with uniform appearance
○: Low degree of scars and blackening, with clearly non-uniform appearance
○−: Localized occurrence of scars and blackening, with clearly non-uniform appearance
Δ: Severe occurrence of scars and blackening mainly at corner portions of the sample
x: Molding failure due to cracking TABLE 1a

| | Resin compound (A) | | | | | |
|---|---|---|---|---|---|---|
| | Y1 Group Z: General formula (II) | | Y2 Group Z: General formula (II) | | Average substitution number of Group Z | |
| No. | R1 | R2 | R1 | R2 | per benzene ring | n |
| A1 | Hydrogen | Hydrogen | Methyl | Ethyl | 0.4 | 5 |
| A2 | Ethyl | Methyl | Hydrogen | Propyl | 0.7 | 3 |
| A3 | Ethyl | Propyl | Hydrogen | Ethyl | 0.4 | 10 |
| A4 | Hydroxyethyl | Hydroxyethyl | Hydroxyethyl | Hydroxyethyl | 0.5 | 5 |
| A5 | —$C_{12}H_{23}$ | Methyl | Hydrogen | Hydrogen | 0.5 | 5 |
| A6 | —$C_{12}H_{22}OH$ | Methyl | Hydrogen | Hydrogen | 0.5 | 5 |
| A7 | Hydrogen | Hydrogen | Methyl | Ethyl | <u>0.1</u> | 5 |
| A8 | Hydrogen | Hydrogen | Methyl | Ethyl | <u>1.2</u> | 5 |
| A9 | Hydrogen | Hydrogen | Methyl | Ethyl | 0.4 | <u>80</u> |

* The group represented by general formula (II) was used as Group Z.

TABLE 1b

| | Resin compound (A) | | | | | | | |
|---|---|---|---|---|---|---|---|---|
| | Y1 Group Z: General formula (III) | | | Y2 Group Z: General formula (III) | | | Average number of substituent Group Z | |
| No. | R3 | R4 | R5 | R3 | R4 | R5 | per benzene ring | n |
| A10 | Hydrogen | Hydrogen | Methyl | Methyl | Ethyl | Methyl | 0.4 | 5 |
| A11 | Ethyl | Methyl | Hydrogen | Hydrogen | Propyl | Hydrogen | 0.7 | 3 |
| A12 | Ethyl | Propyl | Methyl | Hydrogen | Ethyl | Methyl | 0.4 | 10 |
| A13 | Hydroxyethyl | Hydroxyethyl | Hydrogen | Hydroxyethyl | Hydroxyethyl | Hydrogen | 0.5 | 5 |
| A14 | —$C_{12}H_{23}$ | Methyl | Hydrogen | Hydrogen | Hydrogen | Hydrogen | 0.5 | 5 |
| A15 | —$C_{12}H_{22}OH$ | Methyl | Hydrogen | Hydrogen | Hydrogen | Hydrogen | 0.5 | 5 |
| A16 | Hydroxyethyl | Hydroxyethyl | Hydrogen | Hydroxyethyl | Hydroxyethyl | Hydrogen | <u>0.1</u> | 5 |
| A17 | Hydroxyethyl | Hydroxyethyl | Hydrogen | Hydroxyethyl | Hydroxyethyl | Hydrogen | <u>1.2</u> | 5 |
| A18 | Hydroxyethyl | Hydroxyethyl | Hydrogen | Hydroxyethyl | Hydroxyethyl | Hydrogen | 0.5 | <u>70</u> |

* The group represented by general formula (III) was used as Group Z.

TABLE 2

| | Urethane resin (B) | | |
|---|---|---|---|
| No. | Urethane resin (B) | Ionicity | Manufacturer |
| B1 | ADEKA POINTER HUX-670 | Cationic | ADEKA CORPORATION |
| B2 | SUPERFLEX 600 | Cationic | DAI-ICHI KOGYO SEIYAKU Co., Ltd. |
| B3 | PERMARIN UC-20 | Cationic | SANYO CHEMICAL INDUSTRIES, Ltd. |
| B4 | ADEKA POINTER UX-206 | Nonionic | ADEKA CORPORATION |
| B5 | HYDRAN AP-10 | Anionic | DIC CORPORATION |

TABLE 3

| | Silanecouping agent (C) |
|---|---|
| No. | Silane couping agent (C) |
| C1 | 3-mercaptopropyltrimethoxysilane |
| C2 | N-(2-aminoethyl)-3-aminopropyltrimethoxysilane |
| C3 | 3-glycidoxypropyltrimethoxysilane |
| C4 | 3-methacryloxypropyltrimethoxysilane |
| C5 | Vinyltrimethoxysilane |

TABLE 4

| | Titanium compound (D) |
|---|---|
| No. | Titanium compound (D) |
| D1 | Titanium acetylacetonato (Ti: 12.5 mass %) |
| D2 | Titanium tetraacetylacetenato (Ti: 10.8 mass %) |
| D3 | Titanium nitrate (Ti: 16.2 mass %) |
| D4 | Fluorotitanic acid (Ti: 29.2 mass %) |

TABLE 5

| | Vanadium compound (E) |
|---|---|
| No. | Vanadium compound (E) |
| E1 | Vanadyl oxalate (V: 32.9 mass %) |
| E2 | Vanadyl acetylacetonate (V: 19.2 mass %) |
| E3 | Vanadyl sulfate (V: 31.2 mass %) |
| E4 | Ammonium metavanadate (V: 43.5 mass %) |

TABLE 6

| | Molybdic acid compound (F) |
|---|---|
| No. | Molybdic acid compound (F) |
| F1 | $Na_2MoO_4 \cdot 2H_2O$ |
| F2 | $(NH_4)_6Mo_7O_{24} \cdot 4H_2O$ |
| F3 | $(NH_4)_3[PMo_{12}O_{40}] \cdot 3H_2O$ |

TABLE 7

Wax (W) emulsion

| No. | Wax species (W) | Melting point (° C.) | Solid content of dispersion (mass %) | Particle diameter (μm) |
|---|---|---|---|---|
| W1 | Polyethylene oxide wax | 115 | 20 | 0.1 |
| W2 | Microcrystalline wax | 90 | 20 | 0.1 |
| W3 | Paraffin wax | 50 | 20 | 0.1 |

* The aforementioned waxes, which had been forcibly emulsified by emulsifier, were used.

TABLE 8

Coated steel sheet

| No. | Coated steel sheet | Coating weight (g/m²) |
|---|---|---|
| GI | Hot dip galvanized steel sheet | 60 |
| EG | Electrolytic zinc-coated steel sheet | 20 |
| GA | Galvannealed steel sheet | 60 |
| GF1 | Hot-dip Zn—5.0 mass % Al—0.5 mass % Mg alloy coated steel sheet | 90 |
| GF2 | Hot-dip Zn—4.5 mass % Al—0.8 mass % Mg—0.03 mass % Ni alloy coated steel sheet | 90 |
| GF3 | Hot-dip Zn—5.1 mass % Al—0.9 mass % Mg—0.09 mass % Ni alloy coated steel sheet | 60 |
| GF4 | Hot-dip Zn—5.0 mass % Al—0.6 mass % Mg—0.04 mass % Ni alloy coated steel sheet | 90 |

* "Coating weight" above represents coating weight per one surface of a steel sheet, although respective surfaces thereof were coated.

TABLE 9-1

| No. | | (A) Type Table 1 | (A) Solid content mass % | (B) Type Table 2 | (B) Solid content mass % | (C) Type Table 3 | (C) Solid content mass % | (D) Type Table 4 | (D) Ti conversion mass % | (E) Type Table 5 | (E) V conversion mass % |
|---|---|---|---|---|---|---|---|---|---|---|---|
| 1 | Example 1 | A1 | 4 | B1 | 16 | C1 | 60 | D1 | 1 | E1 | 0.4 |
| 2 | Example 2 | A1 | 10 | B1 | 10 | C1 | 60 | D1 | 1 | E1 | 0.4 |
| 3 | Example 3 | A1 | 11 | B1 | 9 | C1 | 60 | D1 | 1 | E1 | 0.4 |
| 4 | Comp. Ex. 1 | A1 | 14 | B1 | 6 | C1 | 60 | D1 | 1 | E1 | 0.4 |
| 5 | Example 4 | A1 | 0.5 | B1 | 22 | C1 | 58 | D1 | 1 | E1 | 0.4 |
| 6 | Example 5 | A1 | 0.5 | B1 | 24 | C1 | 56 | D1 | 1 | E1 | 0.4 |
| 7 | Comp. Ex. 2 | A1 | 0.1 | B1 | 26 | C1 | 55 | D1 | 1 | E1 | 0.4 |
| 8 | Comp. Ex. 3 | A1 | 4 | B1 | 16 | C1 | 60 | D3 | 1 | E1 | 0.4 |
| 9 | Comp. Ex. 4 | A1 | 4 | B1 | 16 | C1 | 60 | D4 | 1 | E1 | 0.4 |
| 10 | Comp. Ex. 5 | A1 | 4 | B1 | 16 | C1 | 60 | D1 | 1 | — | 0 |
| 11 | Comp. Ex. 6 | A1 | 4 | B1 | 16 | C1 | 60 | D1 | 1 | E4 | 0.4 |
| 12 | Comp. Ex. 7 | A1 | 29 | B1 | 6 | C1 | 65 | D4 | 1.1 | — | 0 |
| 13 | Comp. Ex. 8 | A1 | 29 | B1 | 6 | C1 | 65 | D4 | 1.1 | — | 0 |
| 14 | Comp. Ex. 9 | A1 | 20 | B1 | 40 | C2:C3 = 1:1 | 20 | D4 | 1 | E1 | 0.4 |
| 15 | Example 6 | A2 | 4 | B1 | 16 | C2 | 60 | D1 | 1 | E2 | 0.4 |
| 16 | Example 7 | A3 | 4 | B1 | 16 | C2 | 60 | D2 | 1 | E3 | 0.4 |
| 17 | Example 8 | A2 | 4 | B1 | 19 | C3 | 60 | D1 | 1 | E2 | 0.4 |
| 18 | Example 9 | A1 | 4 | B1 | 19 | C2:C3 = 1:1 | 60 | D1 | 1 | E3 | 0.4 |
| 19 | Example 10 | A1 | 4 | B1 | 19 | C1 | 60 | D1:D4 = 10:1 | 1.1 | E2 | 0.4 |
| 20 | Comp. Ex. 10 | A1 | 19 | B1 | 19 | C1 | 45 | D1 | 0.8 | E2 | 0.3 |
| 21 | Example 11 | A1 | 12 | B1 | 19 | C1 | 52 | D1 | 0.9 | E2 | 0.3 |
| 22 | Example 12 | A1 | 4 | B1 | 11 | C1 | 68 | D1 | 1.1 | E2 | 0.4 |
| 23 | Comp. Ex. 11 | A1 | 1 | B1 | 10 | C1 | 72 | D1 | 1.2 | E2 | 0.5 |
| 24 | Comp. Ex. 12 | A1 | 4 | B1 | 16 | C1 | 60 | D1 | 0.8 | E2 | 0.3 |
| 25 | Example 13 | A1 | 4 | B1 | 16 | C1 | 60 | D1 | 0.9 | E2 | 0.4 |
| 26 | Example 14 | A1 | 4 | B1 | 16 | C1 | 60 | D1 | 1.2 | E2 | 0.5 |
| 27 | Comp. Ex. 13 | A1 | 4 | B1 | 16 | C1 | 60 | D1 | 1.3 | E2 | 0.5 |
| 28 | Comp. Ex. 14 | A1 | 4 | B1 | 16 | C1 | 60 | D1 | 1 | E2 | 0.2 |
| 29 | Example 15 | A1 | 4 | B1 | 16 | C1 | 60 | D1 | 1 | E2 | 0.3 |
| 30 | Example 16 | A1 | 4 | B1 | 16 | C1 | 60 | D1 | 1 | E2 | 0.5 |
| 31 | Comp. Ex. 15 | A1 | 4 | B1 | 16 | C1 | 60 | D1 | 1 | E2 | 0.6 |
| 32 | Example 17 | A1 | 4 | B1 | 16 | C1 | 60 | D1 | 1 | E1 | 0.4 |

| No. | | (F) Type Table 6 | (F) Mo conversion mass % | (W) Type Table 7 | (W) Solid content mass % | Acidic component 1 Type | Acidic component 1 mass % |
|---|---|---|---|---|---|---|---|
| 1 | Example 1 | F1 | 0.6 | — | 0 | phosphoric acid | 4 |
| 2 | Example 2 | F1 | 0.6 | — | 0 | phosphoric acid | 4 |
| 3 | Example 3 | F1 | 0.6 | — | 0 | phosphoric acid | 4 |
| 4 | Comp. Ex. 1 | F1 | 0.6 | — | 0 | phosphoric acid | 4 |
| 5 | Example 4 | F1 | 0.6 | — | 0 | phosphoric acid | 4 |

TABLE 9-1-continued

| | | | | | | | | |
|---|---|---|---|---|---|---|---|---|
| 6 | Example 5 | F1 | 0.6 | — | 0 | phosphoric acid | 4 |
| 7 | Comp. Ex. 2 | F1 | 0.6 | — | 0 | phosphoric acid | 4 |
| 8 | Comp. Ex. 3 | F1 | 0.6 | — | 0 | phosphoric acid | 4 |
| 9 | Comp. Ex. 4 | F1 | 0.6 | — | 0 | phosphoric acid | 4 |
| 10 | Comp. Ex. 5 | F1 | 0.6 | — | 0 | phosphoric acid | 4 |
| 11 | Comp. Ex. 6 | F1 | 0.6 | — | 0 | phosphoric acid | 4 |
| 12 | Comp. Ex. 7 | F1 | 0.6 | — | 0 | Nitric acid | 10 |
| 13 | Comp. Ex. 8 | F1 | 0.6 | — | 0 | phosphoric acid | 10 |
| 14 | Comp. Ex. 9 | F1 | 0.6 | — | 0 | phosphoric acid | 6 |
| 15 | Example 6 | F1 | 0.6 | — | 0 | phosphoric acid | 4 |
| 16 | Example 7 | F1 | 0.6 | — | 0 | — | 0 |
| 17 | Example 8 | F1 | 0.6 | — | 0 | phosphoric acid | 5 |
| 18 | Example 9 | F1 | 0.6 | — | 0 | — | 0 |
| 19 | Example 10 | F1 | 0.6 | — | 0 | phosphoric acid | 4 |
| 20 | Comp. Ex. 10 | F1 | 0.6 | — | 0 | phosphoric acid | 4 |
| 21 | Example 11 | F1 | 0.6 | — | 0 | phosphoric acid | 4 |
| 22 | Example 12 | F1 | 0.6 | — | 0 | phosphoric acid | 4 |
| 23 | Comp. Ex. 11 | F1 | 0.6 | — | 0 | phosphoric acid | 4 |
| 24 | Comp. Ex. 12 | F1 | 0.6 | — | 0 | phosphoric acid | 4 |
| 25 | Example 13 | F1 | 0.6 | — | 0 | phosphoric acid | 4 |
| 26 | Example 14 | F1 | 0.6 | — | 0 | phosphoric acid | 4 |
| 27 | Comp. Ex. 13 | F1 | 0.6 | — | 0 | phosphoric acid | 4 |
| 28 | Comp. Ex. 14 | F1 | 0.6 | — | 0 | phosphoric acid | 4 |
| 29 | Example 15 | F1 | 0.6 | — | 0 | phosphoric acid | 4 |
| 30 | Example 16 | F1 | 0.6 | — | 0 | phosphoric acid | 4 |
| 31 | Comp. Ex. 15 | F1 | 0.6 | — | 0 | phosphoric acid | 4 |
| 32 | Example 17 | F1 | 0.6 | — | 0 | phosphoric acid | 4 |

(A): Resin compound having bisphenol skeleton (B): Cationic urethane resin emulsion (C): Silane coupling agent (D): Organic titanium chelate compound
(E): Quadrivalent vanadyl compound (F): Molybdic acid compound

TABLE 9-2

| No. | Acidic component 2 Type | Mass % | pH | (X1) | (X2) | (X3) | (X4) | (X5) | (X6) | $PO_4/(a+b+c)$ | $F/(a+b+c)$ |
|---|---|---|---|---|---|---|---|---|---|---|---|
| 1 | Example 1 | — | 0 | 4.5 | 0.20 | 0.75 | 60 | 0.40 | 0.008 | 0 | 0.050 | 0 |
| 2 | Example 2 | — | 0 | 4.5 | 0.13 | 0.75 | 60 | 0.40 | 0.008 | 0 | 0.050 | 0 |
| 3 | Example 3 | — | 0 | 4.5 | 0.11 | 0.75 | 60 | 0.40 | 0.008 | 0 | 0.050 | 0 |
| 4 | Comp. Ex. 1 | — | 0 | 4.5 | 0.08 | 0.75 | 60 | 0.40 | 0.008 | 0 | 0.050 | 0 |
| 5 | Example 4 | — | 0 | 4.5 | 0.27 | 0.73 | 58 | 0.40 | 0.008 | 0 | 0.050 | 0 |
| 6 | Example 5 | — | 0 | 4.5 | 0.29 | 0.70 | 56 | 0.40 | 0.008 | 0 | 0.050 | 0 |
| 7 | Comp. Ex. 2 | — | 0 | 4.5 | 0.32 | 0.68 | 54 | 0.40 | 0.007 | 0 | 0.049 | 0 |
| 8 | Comp. Ex. 3 | — | 0 | 4.5 | 0.20 | 0.75 | 60 | 0.40 | 0.008 | 0 | 0.050 | 0 |
| 9 | Comp. Ex. 4 | — | 0 | 4.5 | 0.20 | 0.75 | 60 | 0.40 | 0.008 | 0 | 0.050 | 0.030 |
| 10 | Comp. Ex. 5 | — | 0 | 4.5 | 0.20 | 0.75 | 60 | 0 | 0.008 | 0 | 0.050 | 0 |
| 11 | Comp. Ex. 6 | — | 0 | 4.5 | 0.20 | 0.75 | 60 | 0.40 | 0.008 | 0 | 0.050 | 0 |
| 12 | Comp. Ex. 7 | — | 0 | 4.5 | 0.06 | 0.65 | 57 | 0 | 0.006 | 0 | 0.100 | 0.027 |
| 13 | Comp. Ex. 8 | — | 0 | 4.5 | 0.06 | 0.65 | 57 | 0 | 0.006 | 0 | 0.100 | 0.027 |
| 14 | Comp. Ex. 9 | — | 0 | 4.5 | 0.50 | 0.25 | 20 | 0.40 | 0.008 | 0 | 0.075 | 0.030 |
| 15 | Example 6 | — | 0 | 4.5 | 0.20 | 0.75 | 60 | 0.40 | 0.008 | 0 | 0.050 | 0 |
| 16 | Example 7 | $H_2ZrF_6$ | 0.5 | 4.5 | 0.20 | 0.75 | 60 | 0.40 | 0.008 | 0 | 0 | 0.003 |
| 17 | Example 8 | Hydrofluoric acid | 0.5 | 4.5 | 0.23 | 0.72 | 60 | 0.40 | 0.007 | 0 | 0.060 | 0.006 |
| 18 | Example 9 | Hydrofluoric acid | 0.5 | 4.5 | 0.23 | 0.72 | 60 | 0.40 | 0.007 | 0 | 0 | 0.006 |
| 19 | Example 10 | — | 0 | 4.5 | 0.23 | 0.72 | 55 | 0.36 | 0.007 | 0 | 0.048 | 0.003 |
| 20 | Comp. Ex. 10 | — | 0 | 4.5 | 0.23 | 0.54 | 60 | 0.40 | 0.007 | 0 | 0.048 | 0 |
| 21 | Example 11 | — | 0 | 4.5 | 0.23 | 0.63 | 61 | 0.40 | 0.007 | 0 | 0.048 | 0 |
| 22 | Example 12 | — | 0 | 4.5 | 0.13 | 0.82 | 62 | 0.40 | 0.007 | 0 | 0.048 | 0 |
| 23 | Comp. Ex. 11 | — | 0 | 4.5 | 0.12 | 0.87 | 65 | 0.40 | 0.007 | 0 | 0.048 | 0 |
| 24 | Comp. Ex. 12 | — | 0 | 4.5 | 0.20 | 0.75 | 75 | 0.40 | 0.008 | 0 | 0.050 | 0 |
| 25 | Example 13 | — | 0 | 4.5 | 0.20 | 0.75 | 68 | 0.40 | 0.008 | 0 | 0.050 | 0 |
| 26 | Example 14 | — | 0 | 4.5 | 0.20 | 0.75 | 52 | 0.40 | 0.008 | 0 | 0.050 | 0 |
| 27 | Comp. Ex. 13 | — | 0 | 4.5 | 0.20 | 0.75 | 48 | 0.40 | 0.008 | 0 | 0.050 | 0 |
| 28 | Comp. Ex. 14 | — | 0 | 4.5 | 0.20 | 0.75 | 60 | 0.24 | 0.008 | 0 | 0.050 | 0 |
| 29 | Example 15 | — | 0 | 4.5 | 0.20 | 0.75 | 60 | 0.33 | 0.008 | 0 | 0.050 | 0 |
| 30 | Example 16 | — | 0 | 4.5 | 0.20 | 0.75 | 60 | 0.49 | 0.008 | 0 | 0.050 | 0 |
| 31 | Comp. Ex. 15 | — | 0 | 4.5 | 0.20 | 0.75 | 60 | 0.55 | 0.008 | 0 | 0.050 | 0 |
| 32 | Example 17 | — | 0 | 4.5 | 0.20 | 0.75 | 60 | 0.40 | 0.008 | 0 | 0.050 | 0 |

(※) $X1 = (B_s)/(A_s + B_s + C_s)$, $X2 = (C_s)/(A_s + B_s + C_s)$, $X3 = (C_s)/(D_{Ti})$, $X4 = (E_V)/(D_{Ti})$, $X5 = (F_{Mo})/(A_s + B_s + C_s)$, $X6 = (W_s)/(A_s + B_s)$

TABLE 10-1

| No. | | (A) Type Table 1 | (A) Solid content mass % | (B) Type Table 2 | (B) Solid content mass % | (C) Type Table 3 | (C) Solid content mass % | (D) Type Table 4 | (D) Ti conversion mass % | (E) Type Table 5 | (E) V conversion mass % |
|---|---|---|---|---|---|---|---|---|---|---|---|
| 33 | Example 18 | A1 | 4 | B1 | 16 | C1 | 60 | D1 | 1 | E2 | 0.4 |
| 34 | Comp. Ex. 16 | A1 | 4 | B1 | 16 | C1 | 60 | D1 | 1 | E2 | 0.4 |
| 35 | Comp. Ex. 17 | A1 | 4 | B1 | 16 | C1 | 60 | D1 | 1 | E2 | 0.4 |
| 36 | Example 19 | A1 | 4 | B1 | 16 | C1 | 60 | D1 | 1 | E2 | 0.4 |
| 37 | Example 20 | A1 | 4 | B1 | 16 | C1 | 60 | D1 | 1 | E2 | 0.4 |
| 38 | Comp. Ex. 18 | A1 | 4 | B1 | 16 | C1 | 60 | D1 | 1 | E2 | 0.4 |
| 39 | Comp. Ex. 19 | A1 | 4 | B1 | 16 | C1 | 60 | D1 | 1 | E2 | 0.4 |
| 40 | Example 21 | A1 | 4 | B1 | 16 | C1 | 60 | D1 | 1 | E1 | 0.4 |
| 41 | Example 22 | A1 | 4 | B1 | 16 | C1 | 60 | D1 | 1 | E2 | 0.4 |
| 42 | Comp. Ex. 20 | A1 | 4 | B1 | 16 | C1 | 60 | D1 | 1 | E2 | 0.4 |
| 43 | Comp. Ex. 21 | A1 | 4 | B1 | 16 | C1 | 60 | D1 | 1 | E2 | 0.4 |
| 44 | Example 23 | A1 | 4 | B1 | 16 | C1 | 60 | D1 | 1 | E1 | 0.4 |
| 45 | Example 24 | A1 | 4 | B1 | 16 | C1 | 60 | D1 | 1 | E2 | 0.4 |
| 46 | Comp. Ex. 22 | A1 | 4 | B1 | 16 | C1 | 60 | D1 | 1 | E2 | 0.4 |
| 47 | Comp. Ex. 23 | A1 | 4 | B1 | 16 | C1 | 60 | D1 | 1 | E2 | 0.4 |
| 48 | Example 25 | A1 | 4 | B1 | 16 | C1 | 60 | D1 | 1 | E2 | 0.4 |
| 49 | Example 26 | A1 | 4 | B1 | 16 | C1 | 60 | D1 | 1 | E2 | 0.4 |
| 50 | Example 27 | A1 | 4 | B1 | 16 | C1 | 60 | D1 | 1 | E2 | 0.4 |
| 51 | Example 28 | A1 | 4 | B1 | 16 | C1 | 60 | D1 | 1 | E2 | 0.4 |
| 52 | Comp. Ex. 24 | A1 | 4 | B1 | 16 | C1 | 60 | D1 | 1 | E2 | 0.4 |
| 53 | Example 29 | A1 | 4 | B1 | 16 | C1 | 60 | D1 | 1 | E2 | 0.4 |
| 54 | Example 30 | A1 | 4 | B1 | 16 | C1 | 60 | D1 | 1 | E2 | 0.4 |
| 55 | Example 31 | A1 | 4 | B1 | 16 | C1 | 60 | D1 | 1 | E2 | 0.4 |
| 56 | Example 32 | A1 | 4 | B1 | 16 | C1 | 60 | D1 | 1 | E2 | 0.4 |
| 57 | Example 33 | A1 | 4 | B1 | 16 | C1 | 60 | D1 | 1 | E2 | 0.4 |
| 58 | Example 34 | A1 | 4 | B1 | 16 | C1 | 60 | D1 | 1 | E2 | 0.4 |
| 59 | Comp. Ex. 25 | A1 | 4 | B1 | 16 | C1 | 60 | D1 | 1 | E1 | 0.4 |
| 60 | Comp. Ex. 26 | A1 | 4 | B1 | 16 | C1 | 60 | D1 | 1 | E1 | 0.4 |
| 61 | Example 35 | A1 | 4 | B1 | 16 | C1 | 60 | D1 | 1 | E1 | 0.4 |
| 62 | Example 36 | A1 | 4 | B1 | 16 | C1 | 60 | D1 | 1 | E1 | 0.4 |
| 63 | Comp. Ex. 27 | A1 | 4 | B1 | 16 | C1 | 60 | D1 | 1 | E1 | 0.4 |

| No. | | (F) Type Table 6 | (F) Mo conversion mass % | (W) Type Table 7 | (W) Solid content mass % | Acidic component 1 Type | Acidic component 1 mass % |
|---|---|---|---|---|---|---|---|
| 33 | Example 18 | F1 | 0.3 | — | 0 | phosphoric acid | 4 |
| 34 | Comp. Ex. 16 | F1 | 0.1 | — | 0 | phosphoric acid | 4 |
| 35 | Comp. Ex. 17 | — | 0 | — | 0 | phosphoric acid | 4 |
| 36 | Example 19 | F1 | 0.5 | — | 0 | phosphoric acid | 4 |
| 37 | Example 20 | F1 | 0.3 | — | 0 | phosphoric acid | 4 |
| 38 | Comp. Ex. 18 | F1 | 0.1 | — | 0 | phosphoric acid | 4 |
| 39 | Comp. Ex. 19 | — | 0 | — | 0 | phosphoric acid | 4 |
| 40 | Example 21 | F1 | 0.6 | — | 0 | phosphoric acid | 4 |
| 41 | Example 22 | F1 | 0.3 | — | 0 | phosphoric acid | 4 |
| 42 | Comp. Ex. 20 | F1 | 0.1 | — | 0 | phosphoric acid | 4 |
| 43 | Comp. Ex. 21 | — | 0 | — | 0 | phosphoric acid | 4 |
| 44 | Example 23 | F1 | 0.6 | — | 0 | phosphoric acid | 4 |
| 45 | Example 24 | F1 | 0.3 | — | 0 | phosphoric acid | 4 |
| 46 | Comp. Ex. 22 | F1 | 0.1 | — | 0 | phosphoric acid | 4 |
| 47 | Comp. Ex. 23 | — | 0 | — | 0 | phosphoric acid | 4 |
| 48 | Example 25 | F1 | 1 | — | 0 | phosphoric acid | 4 |
| 49 | Example 26 | F1 | 1.5 | — | 0 | phosphoric acid | 4 |
| 50 | Example 27 | F1 | 2 | — | 0 | phosphoric acid | 4 |
| 51 | Example 28 | F1 | 2.4 | — | 0 | phosphoric acid | 4 |
| 52 | Comp. Ex. 24 | F1 | 2.6 | — | 0 | phosphoric acid | 4 |
| 53 | Example 29 | F2 | 0.6 | — | 0 | phosphoric acid | 4 |
| 54 | Example 30 | F3 | 0.6 | — | 0 | phosphoric acid | 4 |
| 55 | Example 31 | F1 | 0.6 | W1 | 6.1 | phosphoric acid | 4 |
| 56 | Example 32 | F1 | 0.6 | W2 | 7.8 | phosphoric acid | 4 |
| 57 | Example 33 | F1 | 0.6 | W3 | 6.1 | phosphoric acid | 4 |
| 58 | Example 34 | F1 | 0.6 | W1 | 5.0 | phosphoric acid | 4 |
| 59 | Comp. Ex. 25 | F1 | 0.6 | — | 0 | phosphoric acid | 4 |
| 60 | Comp. Ex. 26 | F1 | 0.6 | — | 0 | phosphoric acid | 4 |
| 61 | Example 35 | F1 | 0.6 | — | 0 | phosphoric acid | 4 |
| 62 | Example 36 | F1 | 0.6 | — | 0 | phosphoric acid | 4 |
| 63 | Comp. Ex. 27 | F1 | 0.6 | — | 0 | phosphoric acid | 4 |

(A): Resin compound having bisphenol skeleton (B): Cationic urethane resin emulsion (C): Silane coupling agent (D): Organic titanium chelate compound (E): Quadrivalent vanadyl compound (F): Molybdic acid compound

TABLE 10-2

| No. | | Acidic component 2 | | pH | (X1) | (X2) | (X3) | (X4) | (X5) | (X6) | $PO_4/(a+b+c)$ | $F/(a+b+c)$ |
|---|---|---|---|---|---|---|---|---|---|---|---|---|
| | | Type | Mass % | | | | | | | | | |
| 33 | Example 18 | — | 0 | 4.5 | 0.20 | 0.75 | 60 | 0.40 | 0.004 | 0 | 0.050 | 0 |
| 34 | Comp. Ex. 16 | — | 0 | 4.5 | 0.20 | 0.75 | 60 | 0.40 | 0.001 | 0 | 0.050 | 0 |
| 35 | Comp. Ex. 17 | — | 0 | 4.5 | 0.20 | 0.75 | 60 | 0.40 | 0 | 0 | 0.050 | 0 |
| 36 | Example 19 | — | 0 | 4.5 | 0.20 | 0.75 | 60 | 0.40 | 0.006 | 0 | 0.050 | 0 |
| 37 | Example 20 | — | 0 | 4.5 | 0.20 | 0.75 | 60 | 0.40 | 0.004 | 0 | 0.050 | 0 |
| 38 | Comp. Ex. 18 | — | 0 | 4.5 | 0.20 | 0.75 | 60 | 0.40 | 0 | 0 | 0.050 | 0 |
| 39 | Comp. Ex. 19 | — | 0 | 4.5 | 0.20 | 0.75 | 60 | 0.40 | 0 | 0 | 0.050 | 0 |
| 40 | Example 21 | — | 0 | 4.5 | 0.20 | 0.75 | 60 | 0.40 | 0.008 | 0 | 0.050 | 0 |
| 41 | Example 22 | — | 0 | 4.5 | 0.20 | 0.75 | 60 | 0.40 | 0.004 | 0 | 0.050 | 0 |
| 42 | Comp. Ex. 20 | — | 0 | 4.5 | 0.20 | 0.75 | 60 | 0.40 | 0 | 0 | 0.050 | 0 |
| 43 | Comp. Ex. 21 | — | 0 | 4.5 | 0.20 | 0.75 | 60 | 0.40 | 0 | 0 | 0.050 | 0 |
| 44 | Example 23 | — | 0 | 4.5 | 0.20 | 0.75 | 60 | 0.40 | 0.008 | 0 | 0.050 | 0 |
| 45 | Example 24 | — | 0 | 4.5 | 0.20 | 0.75 | 60 | 0.40 | 0.004 | 0 | 0.050 | 0 |
| 46 | Comp. Ex. 22 | — | 0 | 4.5 | 0.20 | 0.75 | 60 | 0.40 | 0.001 | 0 | 0.050 | 0 |
| 47 | Comp. Ex. 23 | — | 0 | 4.5 | 0.20 | 0.75 | 60 | 0.40 | 0 | 0 | 0.050 | 0 |
| 48 | Example 25 | — | 0 | 4.5 | 0.20 | 0.75 | 60 | 0.40 | 0.013 | 0 | 0.050 | 0 |
| 49 | Example 26 | — | 0 | 4.5 | 0.20 | 0.75 | 60 | 0.40 | 0.019 | 0 | 0.050 | 0 |
| 50 | Example 27 | — | 0 | 4.5 | 0.20 | 0.75 | 60 | 0.40 | 0.025 | 0 | 0.050 | 0 |
| 51 | Example 28 | — | 0 | 4.5 | 0.20 | 0.75 | 60 | 0.40 | 0.030 | 0 | 0.050 | 0 |
| 52 | Comp. Ex. 24 | — | 0 | 4.5 | 0.20 | 0.75 | 60 | 0.40 | 0.033 | 0 | 0.050 | 0 |
| 53 | Example 29 | — | 0 | 4.5 | 0.20 | 0.75 | 60 | 0.40 | 0.008 | 0 | 0.050 | 0 |
| 54 | Example 30 | — | 0 | 4.5 | 0.20 | 0.75 | 60 | 0.40 | 0.008 | 0 | 0.050 | 0 |
| 55 | Example 31 | — | 0 | 4.5 | 0.20 | 0.75 | 60 | 0.40 | 0.008 | 0.305 | 0.050 | 0 |
| 56 | Example 32 | — | 0 | 4.5 | 0.20 | 0.75 | 60 | 0.40 | 0.008 | 0.390 | 0.050 | 0 |
| 57 | Example 33 | — | 0 | 4.5 | 0.20 | 0.75 | 60 | 0.40 | 0.008 | 0.305 | 0.050 | 0 |
| 58 | Example 34 | — | 0 | 4.5 | 0.20 | 0.75 | 60 | 0.40 | 0.008 | 0.250 | 0.050 | 0 |
| 59 | Comp. Ex. 25 | — | 0 | 3.0 | 0.20 | 0.75 | 60 | 0.40 | 0.008 | 0 | 0.050 | 0 |
| 60 | Comp. Ex. 26 | — | 0 | 3.4 | 0.20 | 0.75 | 60 | 0.40 | 0.008 | 0 | 0.050 | 0 |
| 61 | Example 35 | — | 0 | 4.0 | 0.20 | 0.75 | 60 | 0.40 | 0.008 | 0 | 0.050 | 0 |
| 62 | Example 36 | — | 0 | 5.0 | 0.20 | 0.75 | 60 | 0.40 | 0.008 | 0 | 0.050 | 0 |
| 63 | Comp. Ex. 27 | — | 0 | 5.5 | 0.20 | 0.75 | 60 | 0.40 | 0.008 | 0 | 0.050 | 0 |

(※) X1 = $(B_s)/(A_s + B_s + C_s)$, X2 = $(C_s)/(A_s + B_s + C_s)$, X3 = $(C_s)/(D_{Ti})$, X4 = $(E_V)/(D_{Ti})$, X5 = $(F_{Mo})/(A_s + B_s + C_s)$, X6 = $(W_s)/(A_3 + B_s)$

TABLE 11-1

| No. | | (A) Type Table 1 | (A) Solid content mass % | (B) Type Table 2 | (B) Solid content mass % | (C) Type Table 3 | (C) Solid content mass % | (D) Type Table 4 | (D) Ti conversion mass % | (E) Type Table 5 | (E) V conversion mass % |
|---|---|---|---|---|---|---|---|---|---|---|---|
| 64 | Comp. Ex. 28 | A1 | 4 | B1 | 16 | C1 | 60 | D1 | 1 | E1 | 0.4 |
| 65 | Comp. Ex. 29 | A1 | 4 | B1 | 16 | C1 | 60 | D1 | 1 | E1 | 0.4 |
| 66 | Example 37 | A1 | 4 | B1 | 16 | C1 | 60 | D1 | 1 | E1 | 0.4 |
| 67 | Example 38 | A1 | 4 | B1 | 16 | C1 | 60 | D1 | 1 | E1 | 0.4 |
| 68 | Example 39 | A1 | 4 | B1 | 16 | C1 | 60 | D1 | 1 | E1 | 0.4 |
| 69 | Example 40 | A1 | 4 | B1 | 16 | C1 | 60 | D1 | 1 | E1 | 0.4 |
| 70 | Comp. Ex. 30 | A1 | 4 | B1 | 16 | C1 | 60 | D1 | 1 | E1 | 0.4 |
| 71 | Comp. Ex. 31 | A1 | 4 | B1 | 16 | C1 | 60 | D1 | 1 | E1 | 0.4 |
| 72 | Example 41 | A1 | 4 | B1 | 16 | C1 | 60 | D1 | 1 | E1 | 0.4 |
| 73 | Example 42 | A1 | 4 | B1 | 16 | C1 | 60 | D1 | 1 | E1 | 0.4 |
| 74 | Comp. Ex. 32 | A1 | 4 | B1 | 16 | C1 | 60 | D1 | 1 | E1 | 0.4 |
| 75 | Example 43 | A4 | 4 | B1 | 16 | C1 | 60 | D1 | 1 | E1 | 0.4 |
| 76 | Comp. Ex. 33 | A5 | 4 | B1 | 16 | C1 | 60 | D1 | 1 | E1 | 0.4 |
| 77 | Comp. Ex. 34 | A6 | 4 | B1 | 16 | C1 | 60 | D1 | 1 | E1 | 0.4 |
| 78 | Comp. Ex. 35 | A7 | 4 | B1 | 16 | C1 | 60 | D1 | 1 | E1 | 0.4 |
| 79 | Comp. Ex. 36 | A8 | 4 | B1 | 16 | C1 | 60 | D1 | 1 | E1 | 0.4 |
| 80 | Comp. Ex. 37 | A9 | 4 | B1 | 16 | C1 | 60 | D1 | 1 | E1 | 0.4 |
| 81 | Example 44 | A10 | 4 | B1 | 16 | C1 | 60 | D1 | 0.9 | E1 | 0.4 |
| 82 | Example 45 | A11 | 4 | B1 | 16 | C1 | 60 | D1 | 1 | E1 | 0.4 |
| 83 | Example 46 | A12 | 10 | B1 | 10 | C1 | 60 | D1 | 1 | E1 | 0.4 |
| 84 | Example 47 | A13 | 4 | B1 | 16 | C1 | 50 | D1 | 1 | E1 | 0.4 |
| 85 | Comp. Ex. 38 | A14 | 4 | B1 | 16 | C1 | 60 | D1 | 1 | E1 | 0.4 |
| 86 | Comp. Ex. 39 | A15 | 4 | B1 | 16 | C1 | 60 | D1 | 1 | E1 | 0.4 |
| 87 | Comp. Ex. 40 | A16 | 4 | B1 | 16 | C1 | 60 | D1 | 1 | E1 | 0.4 |
| 88 | Comp. Ex. 41 | A17 | 4 | B1 | 16 | C1 | 60 | D1 | 1 | E1 | 0.4 |
| 89 | Comp. Ex. 42 | A18 | 4 | B1 | 16 | C1 | 60 | D1 | 1 | E1 | 0.4 |
| 90 | Example 48 | A1 | 4 | B2 | 16 | C1 | 60 | D1 | 1 | E1 | 0.4 |
| 91 | Example 49 | A1 | 4 | B3 | 16 | C1 | 60 | D1 | 1.1 | E1 | 0.4 |
| 92 | Comp. Ex. 43 | A1 | 4 | B4 | 16 | C1 | 60 | D1 | 1 | E1 | 0.4 |
| 93 | Comp. Ex. 44 | A1 | 4 | B5 | 16 | C1 | 60 | D1 | 1 | E1 | 0.4 |
| 94 | Example 50 | A1 | 4 | B1 | 16 | C4 | 64 | D1 | 1 | E1 | 0.4 |
| 95 | Comp. Ex. 45 | A1 | 4 | B1 | 16 | C5 | 60 | D1 | 1 | E1 | 0.4 |

TABLE 11-1-continued

| | No. | | (F) Type Table 6 | (F) Mo conversion mass % | (W) Type Table 7 | (W) Solid content mass % | Acidic component 1 Type | Acidic component 1 mass % |
|---|---|---|---|---|---|---|---|---|
| | 64 | Comp. Ex. 28 | F1 | 0.6 | — | 0 | phosphoric acid | 4 |
| | 65 | Comp. Ex. 29 | F1 | 0.6 | — | 0 | phosphoric acid | 4 |
| | 66 | Example 37 | F1 | 0.6 | — | 0 | phosphoric acid | 4 |
| | 67 | Example 38 | F1 | 0.6 | — | 0 | phosphoric acid | 4 |
| | 68 | Example 39 | F1 | 0.6 | — | 0 | phosphoric acid | 4 |
| | 69 | Example 40 | F1 | 0.6 | — | 0 | phosphoric acid | 4 |
| | 70 | Comp. Ex. 30 | F1 | 0.6 | — | 0 | phosphoric acid | 4 |
| | 71 | Comp. Ex. 31 | F1 | 0.6 | — | 0 | phosphoric acid | 4 |
| | 72 | Example 41 | F1 | 0.6 | — | 0 | phosphoric acid | 4 |
| | 73 | Example 42 | F1 | 0.6 | — | 0 | phosphoric acid | 4 |
| | 74 | Comp. Ex. 32 | F1 | 0.6 | — | 0 | phosphoric acid | 4 |
| | 75 | Example 43 | F1 | 0.6 | — | 0 | phosphoric acid | 4 |
| | 76 | Comp. Ex. 33 | F1 | 0.6 | — | 0 | phosphoric acid | 4 |
| | 77 | Comp. Ex. 34 | F1 | 0.6 | — | 0 | phosphoric acid | 4 |
| | 78 | Comp. Ex. 35 | F1 | 0.6 | — | 0 | phosphoric acid | 4 |
| | 79 | Comp. Ex. 36 | F1 | 0.6 | — | 0 | phosphoric acid | 4 |
| | 80 | Comp. Ex. 37 | F1 | 0.6 | — | 0 | phosphoric acid | 4 |
| | 81 | Example 44 | F1 | 0.6 | — | 0 | phosphoric acid | 4 |
| | 82 | Example 45 | F1 | 0.6 | — | 0 | phosphoric acid | 4 |
| | 83 | Example 46 | F1 | 0.6 | — | 0 | phosphoric acid | 4 |
| | 84 | Example 47 | F1 | 0.6 | — | 0 | phosphoric acid | 4 |
| | 85 | Comp. Ex. 38 | F1 | 0.6 | — | 0 | phosphoric acid | 4 |
| | 86 | Comp. Ex. 39 | F1 | 0.6 | — | 0 | phosphoric acid | 4 |
| | 87 | Comp. Ex. 40 | F1 | 0.6 | — | 0 | phosphoric acid | 4 |
| | 88 | Comp. Ex. 41 | F1 | 0.6 | — | 0 | phosphoric acid | 4 |
| | 89 | Comp. Ex. 42 | F1 | 0.6 | — | 0 | phosphoric acid | 4 |
| | 90 | Example 48 | F1 | 0.6 | — | 0 | phosphoric acid | 4 |
| | 91 | Example 49 | F1 | 0.6 | — | 0 | phosphoric acid | 4 |
| | 92 | Comp. Ex. 43 | F1 | 0.6 | — | 0 | phosphoric acid | 4 |
| | 93 | Comp. Ex. 44 | F1 | 0.6 | — | 0 | phosphoric acid | 4 |
| | 94 | Example 50 | F1 | 0.6 | — | 0 | phosphoric acid | 4 |
| | 95 | Comp. Ex. 45 | F1 | 0.6 | — | 0 | phosphoric acid | 4 |

(A): Resin compound having bisphenol skeleton (B): Cationic urethane resin emulsion (C): Silane coupling agent (D): Organic titanium chelate compound (E): Quadrivalent vanadyl compound (F): Molybdic acid compound

TABLE 11-2

| No. | | Acidic component 2 Type | Acidic component 2 Mass % | pH | (X1) | (X2) | (X3) | (X4) | (X5) | (X6) | $PO_4/(a+b+c)$ | $F/(a+b+c)$ |
|---|---|---|---|---|---|---|---|---|---|---|---|---|
| 64 | Comp. Ex. 28 | — | 0 | 6.0 | 0.20 | 0.75 | 60 | 0.40 | 0.0075 | 0 | 0.050 | 0 |
| 65 | Comp. Ex. 29 | — | 0 | 4.5 | 0.20 | 0.75 | 60 | 0.40 | 0.0075 | 0 | 0.050 | 0 |
| 66 | Example 37 | — | 0 | 4.5 | 0.20 | 0.75 | 60 | 0.40 | 0.0075 | 0 | 0.050 | 0 |
| 67 | Example 38 | — | 0 | 4.5 | 0.20 | 0.75 | 60 | 0.40 | 0.0075 | 0 | 0.050 | 0 |
| 68 | Example 39 | — | 0 | 4.5 | 0.20 | 0.75 | 60 | 0.40 | 0.0075 | 0 | 0.050 | 0 |
| 69 | Example 40 | — | 0 | 4.5 | 0.20 | 0.75 | 60 | 0.40 | 0.0075 | 0 | 0.050 | 0 |
| 70 | Comp. Ex. 30 | — | 0 | 4.5 | 0.20 | 0.75 | 60 | 0.40 | 0.0075 | 0 | 0.050 | 0 |
| 71 | Comp. Ex. 31 | — | 0 | 4.5 | 0.20 | 0.75 | 60 | 0.40 | 0.0075 | 0 | 0.050 | 0 |
| 72 | Example 41 | — | 0 | 4.5 | 0.20 | 0.75 | 60 | 0.40 | 0.0075 | 0 | 0.050 | 0 |
| 73 | Example 42 | — | 0 | 4.5 | 0.20 | 0.75 | 60 | 0.40 | 0.0075 | 0 | 0.050 | 0 |
| 74 | Comp. Ex. 32 | — | 0 | 4.5 | 0.20 | 0.75 | 60 | 0.40 | 0.0075 | 0 | 0.050 | 0 |
| 75 | Example 43 | — | 0 | 4.5 | 0.20 | 0.75 | 60 | 0.40 | 0.0075 | 0 | 0.050 | 0 |
| 76 | Comp. Ex. 33 | — | 0 | 4.5 | 0.20 | 0.75 | 60 | 0.40 | 0.0075 | 0 | 0.050 | 0 |
| 77 | Comp. Ex. 34 | — | 0 | 4.5 | 0.20 | 0.75 | 60 | 0.40 | 0.0075 | 0 | 0.050 | 0 |
| 78 | Comp. Ex. 35 | — | 0 | 4.5 | 0.20 | 0.75 | 60 | 0.40 | 0.0075 | 0 | 0.050 | 0 |
| 79 | Comp. Ex. 36 | — | 0 | 4.5 | 0.20 | 0.75 | 60 | 0.40 | 0.0075 | 0 | 0.050 | 0 |
| 80 | Comp. Ex. 37 | — | 0 | 4.5 | 0.20 | 0.75 | 60 | 0.40 | 0.0075 | 0 | 0.050 | 0 |
| 81 | Example 44 | — | 0 | 4.5 | 0.20 | 0.75 | 64 | 0.43 | 0.0075 | 0 | 0.050 | 0 |
| 82 | Example 45 | — | 0 | 4.5 | 0.20 | 0.75 | 60 | 0.40 | 0.0075 | 0 | 0.050 | 0 |
| 83 | Example 46 | — | 0 | 4.5 | 0.13 | 0.75 | 60 | 0.40 | 0.0075 | 0 | 0.050 | 0 |
| 84 | Example 47 | — | 0 | 4.5 | 0.23 | 0.71 | 50 | 0.40 | 0.0075 | 0 | 0.057 | 0 |
| 85 | Comp. Ex. 38 | — | 0 | 4.5 | 0.20 | 0.75 | 60 | 0.40 | 0.0075 | 0 | 0.050 | 0 |
| 86 | Comp. Ex. 39 | — | 0 | 4.5 | 0.20 | 0.75 | 60 | 0.40 | 0.0075 | 0 | 0.050 | 0 |
| 87 | Comp. Ex. 40 | — | 0 | 4.5 | 0.20 | 0.75 | 60 | 0.40 | 0.0075 | 0 | 0.050 | 0 |
| 88 | Comp. Ex. 41 | — | 0 | 4.5 | 0.20 | 0.75 | 60 | 0.40 | 0.0075 | 0 | 0.050 | 0 |
| 89 | Comp. Ex. 42 | — | 0 | 4.5 | 0.20 | 0.75 | 60 | 0.40 | 0.0075 | 0 | 0.050 | 0 |
| 90 | Example 48 | — | 0 | 4.5 | 0.20 | 0.75 | 60 | 0.40 | 0.0075 | 0 | 0.050 | 0 |
| 91 | Example 49 | — | 0 | 4.5 | 0.20 | 0.75 | 56 | 0.37 | 0.0075 | 0 | 0.050 | 0 |
| 92 | Comp. Ex. 43 | — | 0 | 4.5 | 0.20 | 0.75 | 60 | 0.40 | 0.0075 | 0 | 0.050 | 0 |

TABLE 11-2-continued

| No. | Acidic component 2 Type | Mass % | pH | (X1) | (X2) | (X3) | (X4) | (X5) | (X6) | $PO_4/(a+b+c)$ | $F/(a+b+c)$ |
|---|---|---|---|---|---|---|---|---|---|---|---|
| 93 | Comp. Ex. 44 | — | 0 | 4.5 | 0.20 | 0.75 | 60 | 0.40 | 0.0075 | 0 | 0.050 | 0 |
| 94 | Example 50 | — | 0 | 4.5 | 0.19 | 0.76 | 64 | 0.40 | 0.0075 | 0 | 0.048 | 0 |
| 95 | Comp. Ex. 45 | — | 0 | 4.5 | 0.20 | 0.75 | 60 | 0.40 | 0.0075 | 0 | 0.050 | 0 |

(X) $X1 = (B_s)/(A_s + B_s + C_s)$, $X2 = (C_s)/(A_s + B_s + C_s)$, $X3 = (C_s)/(D_{Ti})$, $X4 = (E_V)/(D_{Ti})$, $X5 = (F_{Mo})/(A_s + B_s + C_s)$, $X6 = (W_s)/(A_s + B_s)$

TABLE 12-1

| No. | | Coated steel sheet | Drying temperature (° C.) | Coating weight (g/m²) | Note |
|---|---|---|---|---|---|
| 1 | Example 1 | GF3 | 100 | 1.0 | |
| 2 | Example 2 | GF3 | 100 | 1.0 | |
| 3 | Example 3 | GF3 | 100 | 1.0 | |
| 4 | Comp. Ex. 1 | GF3 | 100 | 1.0 | |
| 5 | Example 4 | GF3 | 100 | 1.0 | |
| 6 | Example 5 | GF3 | 100 | 1.0 | |
| 7 | Comp. Ex. 2 | GF3 | 100 | 1.0 | |
| 8 | Comp. Ex. 3 | GF3 | 100 | 1.0 | |
| 9 | Comp. Ex. 4 | GF3 | 100 | 1.0 | |
| 10 | Comp. Ex. 5 | GF3 | 100 | 1.0 | |
| 11 | Comp. Ex. 6 | GF3 | 100 | 1.0 | |
| 12 | Comp. Ex. 7 | GF3 | 100 | 1.0 | Ref. JP-B 3883831 |
| 13 | Comp. Ex. 8 | GF3 | 100 | 1.0 | |
| 14 | Comp. Ex. 9 | GF3 | 100 | 1.0 | Ref. JP-A 2006-152436 |
| 15 | Example 6 | GF3 | 100 | 1.0 | |
| 16 | Example 7 | GI | 100 | 1.0 | |
| 17 | Example 8 | GA | 100 | 1.0 | |
| 18 | Example 9 | GF1 | 100 | 1.0 | |
| 19 | Example 10 | EG | 100 | 1.0 | |
| 20 | Comp. Ex. 10 | GF3 | 100 | 1.0 | |
| 21 | Example 11 | GF3 | 100 | 1.0 | |
| 22 | Example 12 | GF3 | 100 | 1.0 | |
| 23 | Comp. Ex. 11 | GF3 | 100 | 1.0 | |
| 24 | Comp. Ex. 12 | GF3 | 100 | 1.0 | |
| 25 | Example 13 | GF3 | 100 | 1.0 | |
| 26 | Example 14 | GF3 | 100 | 1.0 | |
| 27 | Comp. Ex. 13 | GF3 | 100 | 1.0 | |
| 28 | Comp. Ex. 14 | GF3 | 100 | 1.0 | |
| 29 | Example 15 | GF3 | 100 | 1.0 | |
| 30 | Example 16 | GF3 | 100 | 1.0 | |
| 31 | Comp. Ex. 15 | GF3 | 100 | 1.0 | |
| 32 | Example 17 | GF4 | 100 | 1.0 | |
| 33 | Example 18 | GF4 | 100 | 1.0 | |
| 34 | Comp. Ex. 16 | GF4 | 100 | 1.0 | |
| 35 | Comp. Ex. 17 | GF4 | 100 | 1.0 | |
| 36 | Example 19 | GF3 | 100 | 1.0 | |
| 37 | Example 20 | GF3 | 100 | 1.0 | |
| 38 | Comp. Ex. 18 | GF3 | 100 | 1.0 | |
| 39 | Comp. Ex. 19 | GF3 | 100 | 1.0 | |
| 40 | Example 21 | GF2 | 100 | 1.0 | |
| 41 | Example 22 | GF2 | 100 | 1.0 | |
| 42 | Comp. Ex. 20 | GF2 | 100 | 1.0 | |
| 43 | Comp. Ex. 21 | GF2 | 100 | 1.0 | |
| 44 | Example 23 | GF1 | 100 | 1.0 | |
| 45 | Example 24 | GF1 | 100 | 1.0 | |
| 46 | Comp. Ex. 22 | GF1 | 100 | 1.0 | |
| 47 | Comp. Ex. 23 | GF1 | 100 | 1.0 | |
| 48 | Example 25 | GF3 | 100 | 1.0 | |

TABLE 12-2

| No. | | Coated steel sheet | Drying temperature (° C.) | Coating weight (g/m²) | Note |
|---|---|---|---|---|---|
| 49 | Example 26 | GF3 | 100 | 1.0 | |
| 50 | Example 27 | GF3 | 100 | 1.0 | |
| 51 | Example 28 | GF3 | 100 | 1.0 | |
| 52 | Comp. Ex. 24 | GF3 | — | — | The test was stopped due to gelling of the surface treatment liquid. |
| 53 | Example 29 | GF3 | 100 | 1.0 | |
| 54 | Example 30 | GF3 | 100 | 1.0 | |
| 55 | Example 31 | GF3 | 100 | 1.0 | |
| 56 | Example 32 | GF3 | 100 | 1.0 | |
| 57 | Example 33 | GF3 | 100 | 1.0 | |
| 58 | Example 34 | GF3 | 100 | 1.0 | |
| 59 | Comp. Ex. 25 | GF3 | 100 | 1.0 | |
| 60 | Comp. Ex. 26 | GF3 | 100 | 1.0 | |
| 61 | Example 35 | GF3 | 100 | 1.0 | |
| 62 | Example 36 | GF3 | 100 | 1.0 | |
| 63 | Comp. Ex. 27 | GF3 | 100 | 1.0 | |
| 64 | Comp. Ex. 28 | GF3 | — | — | The test was stopped due to gelling of the surface treatment liquid. |
| 65 | Comp. Ex. 29 | GF3 | 100 | 0.1 | |
| 66 | Example 37 | GF3 | 100 | 0.3 | |
| 67 | Example 38 | GF3 | 100 | 0.5 | |
| 68 | Example 39 | GF3 | 100 | 1.3 | |
| 69 | Example 40 | GF3 | 100 | 1.5 | |
| 70 | Comp. Ex. 30 | GF3 | 100 | 2.0 | |
| 71 | Comp. Ex. 31 | GF3 | 40 | 1.0 | |
| 72 | Example 41 | GF3 | 60 | 1.0 | |
| 73 | Example 42 | GF3 | 140 | 1.0 | |
| 74 | Comp. Ex. 32 | GF3 | 220 | 1.0 | |
| 75 | Example 43 | GF3 | 100 | 1.0 | |
| 76 | Comp. Ex. 33 | GF3 | — | — | The test was stopped due to presence of undissolved materials. |
| 77 | Comp. Ex. 34 | GF3 | — | — | The test was stopped due to presence of undissolved materials. |
| 78 | Comp. Ex. 35 | GF3 | — | — | The test was stopped due to presence of undissolved materials. |
| 79 | Comp. Ex. 36 | GF3 | 100 | 1.0 | |
| 80 | Comp. Ex. 37 | GF3 | 100 | 1.0 | |
| 81 | Example 44 | GF3 | 100 | 1.0 | |
| 82 | Example 45 | GF3 | 100 | 1.0 | |
| 83 | Example 46 | GF3 | 100 | 1.0 | |
| 84 | Example 47 | GF3 | 100 | 1.0 | |
| 85 | Comp. Ex. 38 | GF3 | — | — | The test was stopped due to presence |

TABLE 12-2-continued

| No. | | Coated steel sheet | Drying temperature (° C.) | Coating weight (g/m²) | Note |
|---|---|---|---|---|---|
| 86 | Comp. Ex. 39 | GF3 | — | — | The test was stopped due to presence of undissolved materials. |
| 87 | Comp. Ex. 40 | GF3 | — | — | The test was stopped due to presence of undissolved materials. |
| 88 | Comp. Ex. 41 | GF3 | 100 | 1.0 | |
| 89 | Comp. Ex. 42 | GF3 | 100 | 1.0 | |
| 90 | Example 48 | GF3 | 100 | 1.0 | |
| 91 | Example 49 | GF3 | 100 | 1.0 | |
| 92 | Comp. Ex. 43 | GF3 | — | — | The test was stopped due to coagulation of the urethane resin. |
| 93 | Comp. Ex. 44 | GF3 | — | — | The test was stopped due to coagulation of the urethane resin. |
| 94 | Example 50 | GF3 | 100 | 1.0 | |
| 95 | Comp. Ex. 45 | GF3 | 100 | 1.0 | |

TABLE 13-1

| No. | | Corrosion resistance (1) Flat surface portion | (2) Bending processed portion | (3) After degreasing | Anti-black patina property (4) | Heat discoloration resistance (5) | Paintability (6) Without degreasing | (7) After degreasing | Solvent resistance (8) |
|---|---|---|---|---|---|---|---|---|---|
| 1 | Example 1 | ⊚ | ⊚ | ⊚ | ⊚ | ⊚ | ⊚ | ⊚ | ⊚ |
| 2 | Example 2 | ⊚ | ○+ | ⊚ | ⊚ | ○ | ⊚ | ⊚ | ⊚ |
| 3 | Example 3 | ⊚ | ○− | ⊚ | ⊚ | ○ | ⊚ | ⊚ | ⊚ |
| 4 | Comp. Ex. 1 | ⊚ | X | ⊚ | ⊚ | X | ⊚ | ⊚ | ⊚ |
| 5 | Example 4 | ⊚ | ⊚ | ⊚ | ⊚ | ⊚ | ⊚ | ○+ | ○ |
| 6 | Example 5 | ⊚ | ⊚ | ○− | ⊚ | ⊚ | ⊚ | ○− | ○− |
| 7 | Comp. Ex. 2 | ⊚ | ⊚ | Δ | ⊚ | ⊚ | ⊚ | Δ | X |
| 8 | Comp. Ex. 3 | ⊚ | X | X | ⊚ | ⊚ | ○ | X | ○+ |
| 9 | Comp. Ex. 4 | ⊚ | X | ○ | ⊚ | ⊚ | ⊚ | ⊚ | ⊚ |
| 10 | Comp. Ex. 5 | ○ | X | X | ⊚ | ⊚ | ⊚ | ⊚ | ⊚ |
| 11 | Comp. Ex. 6 | ⊚ | Δ | X | ⊚ | ⊚ | ⊚ | X | ⊚ |
| 12 | Comp. Ex. 7 | ⊚ | X | ○ | ⊚ | ⊚ | ⊚ | ○ | ⊚ |
| 13 | Comp. Ex. 8 | ⊚ | X | ○ | ⊚ | ⊚ | ⊚ | ○+ | ⊚ |
| 14 | Comp. Ex. 9 | ⊚ | X | Δ | ⊚ | Δ | ⊚ | ○− | X |
| 15 | Example 6 | ⊚ | ⊚ | ⊚ | ⊚ | ⊚ | ⊚ | ⊚ | ⊚ |
| 16 | Example 7 | ⊚ | ○ | ⊚ | ⊚ | ⊚ | ⊚ | ⊚ | ⊚ |
| 17 | Example 8 | ⊚ | ⊚ | ⊚ | ⊚ | ⊚ | ⊚ | ⊚ | ⊚ |
| 18 | Example 9 | ⊚ | ○ | ○ | ⊚ | ⊚ | ⊚ | ⊚ | ⊚ |
| 19 | Example 10 | ⊚ | ⊚ | ⊚ | ⊚ | ⊚ | ⊚ | ⊚ | ⊚ |
| 20 | Comp. Ex. 10 | ⊚ | ○ | ○ | ⊚ | Δ | ○+ | Δ | X |
| 21 | Example 11 | ⊚ | ○+ | ○+ | ⊚ | ○ | ⊚ | ⊚ | ⊚ |
| 22 | Example 12 | ⊚ | ○+ | ⊚ | ⊚ | ⊚ | ⊚ | ⊚ | ⊚ |
| 23 | Comp. Ex. 11 | ⊚ | X | ○ | ⊚ | ⊚ | ⊚ | ⊚ | ⊚ |
| 24 | Comp. Ex. 12 | Δ | Δ | X | ⊚ | ⊚ | ⊚ | ○+ | X | ○+ |
| 25 | Example 13 | ○ | ○− | ○− | ⊚ | ⊚ | ⊚ | ⊚ | ⊚ |
| 26 | Example 14 | ⊚ | ○− | ⊚ | ⊚ | ⊚ | ⊚ | ⊚ | ⊚ |
| 27 | Comp. Ex. 13 | ⊚ | X | ⊚ | ⊚ | ⊚ | ⊚ | ⊚ | ⊚ |
| 28 | Comp. Ex. 14 | X | X | X | ⊚ | ⊚ | ⊚ | ⊚ | ○ |
| 29 | Example 15 | ○ | ○− | ○− | ⊚ | ⊚ | ⊚ | ⊚ | ⊚ |
| 30 | Example 16 | ○+ | ○− | ○− | ⊚ | ⊚ | ⊚ | ○ | ⊚ |
| 31 | Comp. Ex. 15 | ⊚ | ○− | X | ⊚ | ⊚ | ⊚ | X | ○ |
| 32 | Example 17 | ⊚ | ⊚ | ⊚ | ⊚ | ⊚ | ⊚ | ⊚ | ⊚ |

| No. | | Appearance | Storage stability (9) Corrosion resistance Flat surface portion | Bending processed portion | After degreasing | Lubricity (10) |
|---|---|---|---|---|---|---|
| 1 | Example 1 | ⊚ | ⊚ | ⊚ | ⊚ | ○ |
| 2 | Example 2 | ⊚ | ⊚ | ○+ | ○+ | ○− |
| 3 | Example 3 | ⊚ | ⊚ | ○+ | ○− | ○− |

TABLE 13-1-continued

| | | | | | | | |
|---|---|---|---|---|---|---|---|
| 4 | Comp. Ex. 1 | ◎ | ○ | X | X | ○− | |
| 5 | Example 4 | ◎ | ◎ | ◎ | ◎ | ○ | |
| 6 | Example 5 | ◎ | ◎ | ◎ | ○− | ○ | |
| 7 | Comp. Ex. 2 | ◎ | ◎ | ○ | X | ○ | |
| 8 | Comp. Ex. 3 | ◎ | ○+ | X | X | ○ | |
| 9 | Comp. Ex. 4 | ◎ | ◎ | X | Δ | ○ | |
| 10 | Comp. Ex. 5 | ◎ | ○ | X | X | ○ | |
| 11 | Comp. Ex. 6 | Δ | ○ | X | X | ○ | |
| 12 | Comp. Ex. 7 | ◎ | Δ | X | ○− | ○− | |
| 13 | Comp. Ex. 8 | ◎ | ○− | X | Δ | ○− | |
| 14 | Comp. Ex. 9 | ◎ | ○− | X | X | ○ | |
| 15 | Example 6 | ◎ | ◎ | ◎ | ◎ | ○ | |
| 16 | Example 7 | ◎ | ◎ | ○ | ◎ | ○ | |
| 17 | Example 8 | ◎ | ◎ | ◎ | ◎ | ○ | |
| 18 | Example 9 | ◎ | ◎ | ○ | ○ | ○ | |
| 19 | Example 10 | ◎ | ◎ | ◎ | ◎ | ○ | |
| 20 | Comp. Ex. 10 | ◎ | ◎ | ○− | ○− | ○ | |
| 21 | Example 11 | ◎ | ◎ | ○ | ○ | ○ | |
| 22 | Example 12 | ◎ | ○ | ○− | ○− | ○− | |
| 23 | Comp. Ex. 11 | ◎ | X | X | X | ○− | |
| 24 | Comp. Ex. 12 | ◎ | Δ | X | X | ○ | |
| 25 | Example 13 | ◎ | ○ | ○− | ○− | ○ | |
| 26 | Example 14 | ◎ | ◎ | Δ | ○− | ○ | |
| 27 | Comp. Ex. 13 | Δ | ○ | X | X | ○ | |
| 28 | Comp. Ex. 14 | ◎ | X | X | X | ○ | |
| 29 | Example 15 | ◎ | ○ | ○− | ○− | ○ | |
| 30 | Example 16 | ◎ | ○ | ○− | ○− | ○ | |
| 31 | Comp. Ex. 15 | ◎ | ○ | X | X | ○ | |
| 32 | Example 17 | ◎ | ◎ | ◎ | ◎ | ○ | |

TABLE 13-2

| No. | | Corrosion resistance | | | Anti-black patina property (4) | Heat discoloration resistance (5) | Paintability | | Solvent resistance (8) |
|---|---|---|---|---|---|---|---|---|---|
| | | (1) Flat surface portion | (2) Bending processed portion | (3) After degreasing | | | (6) Without degreasing | (7) After degreasing | |
| 33 | Example 18 | ◎ | ◎ | ◎ | ○ | ◎ | ◎ | ◎ | ◎ |
| 34 | Comp. Ex. 16 | ◎ | ◎ | ◎ | Δ | ◎ | ◎ | ◎ | ◎ |
| 35 | Comp. Ex. 17 | ◎ | ◎ | ◎ | Δ | ◎ | ◎ | ◎ | ◎ |
| 36 | Example 19 | ◎ | ◎ | ◎ | ◎ | ◎ | ◎ | ◎ | ◎ |
| 37 | Example 20 | ◎ | ◎ | ◎ | ○ | ◎ | ◎ | ◎ | ◎ |
| 38 | Comp. Ex. 18 | ◎ | ◎ | ◎ | Δ | ◎ | ◎ | ◎ | ◎ |
| 39 | Comp. Ex. 19 | ◎ | ◎ | ◎ | Δ | ◎ | ◎ | ◎ | ◎ |
| 40 | Example 21 | ◎ | ◎ | ◎ | ◎ | ◎ | ◎ | ◎ | ◎ |
| 41 | Example 22 | ◎ | ◎ | ◎ | ○ | ◎ | ◎ | ◎ | ◎ |
| 42 | Comp. Ex. 20 | ◎ | ◎ | ◎ | Δ | ◎ | ◎ | ◎ | ◎ |
| 43 | Comp. Ex. 21 | ◎ | ◎ | ◎ | Δ | ◎ | ◎ | ◎ | ◎ |
| 44 | Example 23 | ◎ | ◎ | ◎ | ◎ | ◎ | ◎ | ◎ | ◎ |
| 45 | Example 24 | ◎ | ◎ | ◎ | ○ | ◎ | ◎ | ◎ | ◎ |
| 46 | Comp. Ex. 22 | ◎ | ◎ | ◎ | X | ◎ | ◎ | ◎ | ◎ |
| 47 | Comp. Ex. 23 | ◎ | ◎ | ◎ | X | ◎ | ◎ | ◎ | ◎ |
| 48 | Example 25 | ◎ | ◎ | ◎ | ◎ | ◎ | ◎ | ◎ | ◎ |
| 49 | Example 26 | ◎ | ◎ | ◎ | ◎ | ◎ | ◎ | ◎ | ◎ |
| 50 | Example 27 | ◎ | ◎ | ◎ | ◎ | ◎ | ◎ | ◎ | ◎ |
| 51 | Example 28 | ◎ | ◎ | ◎ | ◎ | ◎ | ◎ | ◎ | ◎ |
| 52 | Comp. Ex. 24 | The test was stopped due to gelling of the surface treatment liquid. | | | | | | | |
| 53 | Example 29 | ◎ | ◎ | ◎ | ◎ | ◎ | ◎ | ◎ | ◎ |
| 54 | Example 30 | ◎ | ◎ | ◎ | ◎ | ◎ | ◎ | ◎ | ◎ |
| 55 | Example 31 | ◎ | ◎ | ◎ | ◎ | ◎ | ◎ | ◎ | ◎ |
| 56 | Example 32 | ◎ | ◎ | ◎ | ◎ | ◎ | ◎ | ◎ | ◎ |
| 57 | Example 33 | ◎ | ◎ | ◎ | ◎ | ◎ | ◎ | ◎ | ◎ |
| 58 | Example 34 | ◎ | ◎ | ◎ | ◎ | ◎ | ◎ | ◎ | ◎ |
| 59 | Comp. Ex. 25 | ○− | X | ○− | ◎ | ◎ | Δ | Δ | ◎ |
| 60 | Comp. Ex. 26 | ○ | Δ | ○− | ◎ | ◎ | ○ | ○ | ◎ |
| 61 | Example 35 | ○+ | ○+ | ○+ | ◎ | ◎ | ◎ | ◎ | ◎ |
| 62 | Example 36 | ◎ | ◎ | ◎ | ◎ | ◎ | ◎ | ◎ | ◎ |
| 63 | Comp. Ex. 27 | Δ | Δ | Δ | ◎ | ◎ | ◎ | ○ | ◎ |

TABLE 13-2-continued

| | No. | | Appearance | Corrosion resistance Flat surface portion | Bending processed portion | After degreasing | Lubricity (10) |
|---|---|---|---|---|---|---|---|
| 33 | Example 18 | | ◎ | ◎ | ◎ | ◎ | ○ |
| 34 | Comp. Ex. 16 | | ◎ | ◎ | ◎ | ◎ | ○ |
| 35 | Comp. Ex. 17 | | ◎ | ◎ | ◎ | ◎ | ○ |
| 36 | Example 19 | | ◎ | ◎ | ◎ | ◎ | ○ |
| 37 | Example 20 | | ◎ | ◎ | ◎ | ◎ | ○ |
| 38 | Comp. Ex. 18 | | ◎ | ◎ | ◎ | ◎ | ○ |
| 39 | Comp. Ex. 19 | | ◎ | ◎ | ◎ | ◎ | ○ |
| 40 | Example 21 | | ◎ | ◎ | ◎ | ◎ | ○ |
| 41 | Example 22 | | ◎ | ◎ | ◎ | ◎ | ○ |
| 42 | Comp. Ex. 20 | | ◎ | ◎ | ◎ | ◎ | ○ |
| 43 | Comp. Ex. 21 | | ◎ | ◎ | ◎ | ◎ | ○ |
| 44 | Example 23 | | ◎ | ◎ | ◎ | ◎ | ○ |
| 45 | Example 24 | | ◎ | ◎ | ◎ | ◎ | ○ |
| 46 | Comp. Ex. 22 | | ◎ | ◎ | ◎ | ◎ | ○ |
| 47 | Comp. Ex. 23 | | ◎ | ◎ | ◎ | ◎ | ○ |
| 48 | Example 25 | | ◎ | ◎ | ◎ | ◎ | ○ |
| 49 | Example 26 | | ◎ | ◎ | ◎ | ◎ | ○ |
| 50 | Example 27 | | ◎ | ◎ | ◎ | ◎ | ○ |
| 51 | Example 28 | | ◎ | ○ | ○ | ○ | ○ |
| 52 | Comp. Ex. 24 | | The test was stopped due to gelling of the surface treatment liquid. | | | | |
| 53 | Example 29 | | ◎ | ◎ | ◎ | ◎ | ○ |
| 54 | Example 30 | | ◎ | ◎ | ◎ | ◎ | ○ |
| 55 | Example 31 | | ◎ | ◎ | ◎ | ◎ | ◎ |
| 56 | Example 32 | | ◎ | ◎ | ◎ | ◎ | ◎ |
| 57 | Example 33 | | ◎ | ◎ | ◎ | ◎ | ○ |
| 58 | Example 34 | | ◎ | ◎ | ◎ | ◎ | ○+ |
| 59 | Comp. Ex. 25 | | ◎ | △ | X | X | ○ |
| 60 | Comp. Ex. 26 | | ◎ | △ | X | X | ○ |
| 61 | Example 35 | | ◎ | ○+ | ○ | ○ | ○ |
| 62 | Example 36 | | ◎ | ◎ | ◎ | ◎ | ○ |
| 63 | Comp. Ex. 27 | | ◎ | △ | △ | △ | ○ |

TABLE 13-3

| No. | | Corrosion resistance (1) Flat surface portion | (2) Bending processed portion | (3) After degreasing | Anti-black patina property (4) | Heat discoloration resistance (5) | Paintability (6) Without degreasing | (7) After degreasing | Solvent resistance (8) |
|---|---|---|---|---|---|---|---|---|---|
| 64 | Comp. Ex. 28 | The test was stopped due to gelling of the surface treatment liquid. | | | | | | | |
| 65 | Comp. Ex. 29 | X | X | X | ◎ | ◎ | ◎ | ○- | ◎ |
| 66 | Example 37 | ○ | ○- | ○- | ◎ | ◎ | ◎ | ◎ | ◎ |
| 67 | Example 38 | ○+ | ○- | ○- | ◎ | ◎ | ◎ | ◎ | ◎ |
| 68 | Example 39 | ◎ | ◎ | ◎ | ◎ | ◎ | ◎ | ◎ | ○+ |
| 69 | Example 40 | ◎ | ◎ | ◎ | ◎ | ○ | ○ | ○ | ○ |
| 70 | Comp. Ex. 30 | ◎ | ○ | ◎ | ◎ | ○ | X | X | △ |
| 71 | Comp. Ex. 31 | ○ | ○ | X | ◎ | ◎ | ○ | X | △ |
| 72 | Example 41 | ○+ | ○+ | ○+ | ◎ | ◎ | ◎ | ○ | ○ |
| 73 | Example 42 | ◎ | ◎ | ◎ | ◎ | ◎ | ◎ | ◎ | ◎ |
| 74 | Comp. Ex. 32 | ◎ | △ | ◎ | ◎ | ◎ | △ | △ | ◎ |
| 75 | Example 43 | ◎ | ◎ | ◎ | ◎ | ◎ | ◎ | ◎ | ◎ |
| 76 | Comp. Ex. 33 | The test was stopped due to coagulation of urethane resin. | | | | | | | |
| 77 | Comp. Ex. 34 | The test was stopped due to coagulation of urethane resin. | | | | | | | |
| 78 | Comp. Ex. 35 | The test was stopped due to coagulation of urethane resin. | | | | | | | |
| 79 | Comp. Ex. 36 | △ | X | X | ○ | ◎ | ○ | X | ◎ |
| 80 | Comp. Ex. 37 | ◎ | △ | ○ | ○ | ◎ | ◎ | ◎ | ◎ |
| 81 | Example 44 | ◎ | ◎ | ◎ | ◎ | ◎ | ◎ | ◎ | ◎ |
| 82 | Example 45 | ◎ | ○ | ◎ | ◎ | ○ | ◎ | ◎ | ◎ |
| 83 | Example 46 | ◎ | ◎ | ○ | ◎ | ◎ | ◎ | ○ | ◎ |
| 84 | Example 47 | ◎ | ◎ | ◎ | ◎ | ◎ | ◎ | ◎ | ◎ |
| 85 | Comp. Ex. 38 | The test was stopped due to coagulation of urethane resin. | | | | | | | |
| 86 | Comp. Ex. 39 | The test was stopped due to coagulation of urethane resin. | | | | | | | |
| 87 | Comp. Ex. 40 | The test was stopped due to coagulation of urethane resin. | | | | | | | |
| 88 | Comp. Ex. 41 | △ | X | X | ○ | ◎ | ○ | X | ◎ |
| 89 | Comp. Ex. 42 | ◎ | △ | ○ | ○ | ◎ | ◎ | ◎ | ◎ |
| 90 | Example 48 | ◎ | ◎ | ◎ | ◎ | ◎ | ◎ | ◎ | ◎ |

TABLE 13-3-continued

| | No. | | | | | | | | |
|---|---|---|---|---|---|---|---|---|---|
| 91 | Example 49 | ◎ | ◎ | ○ | ◎ | ◎ | ◎ | ○ | ◎ |
| 92 | Comp. Ex. 43 | | | The test was stopped due to coagulation of urethane resin. | | | | | |
| 93 | Comp. Ex. 44 | | | The test was stopped due to coagulation of urethane resin. | | | | | |
| 94 | Example 50 | ◎ | ◎ | ◎ | ◎ | ◎ | ◎ | ◎ | ◎ |
| 95 | Comp. Ex. 45 | ◎ | Δ | X | ○ | ◎ | ○ | Δ | ○ |

| | | | Storage stability (9) | | | |
|---|---|---|---|---|---|---|
| | | | | Corrosion resistance | | |
| No. | | Appearance | Flat surface portion | Bending processed portion | After degreasing | Lubricity (10) |
| 64 | Comp. Ex. 28 | The test was stopped due to gelling of the surface treatment liquid. | | | | |
| 65 | Comp. Ex. 29 | ◎ | X | X | X | ○ |
| 66 | Example 37 | ◎ | ○ | ○− | ○− | ○ |
| 67 | Example 38 | ◎ | ○+ | ○− | ○− | ○ |
| 68 | Example 39 | ◎ | ◎ | ◎ | ◎ | ○ |
| 69 | Example 40 | ◎ | ◎ | ◎ | ◎ | ○ |
| 70 | Comp. Ex. 30 | ◎ | ◎ | ○ | ◎ | ○ |
| 71 | Comp. Ex. 31 | ◎ | ○ | ○ | X | ○ |
| 72 | Example 41 | ◎ | ○+ | ○+ | ○+ | ○ |
| 73 | Example 42 | ◎ | ◎ | ◎ | ◎ | ○ |
| 74 | Comp. Ex. 32 | ◎ | ◎ | Δ | ◎ | ○ |
| 75 | Example 43 | ◎ | ◎ | ◎ | ◎ | ○ |
| 76 | Comp. Ex. 33 | The test was stopped due to coagulation of urethane resin. | | | | |
| 77 | Comp. Ex. 34 | The test was stopped due to coagulation of urethane resin. | | | | |
| 78 | Comp. Ex. 35 | The test was stopped due to coagulation of urethane resin. | | | | |
| 79 | Comp. Ex. 36 | ◎ | X | X | X | ○ |
| 80 | Comp. Ex. 37 | X | The test was stopped due to gelling of the surface treatment liquid. | | | ○ |
| 81 | Example 44 | ◎ | ◎ | ◎ | ◎ | ○ |
| 82 | Example 45 | ◎ | ◎ | ○ | ◎ | ○ |
| 83 | Example 46 | ◎ | ◎ | ◎ | ○ | ○ |
| 84 | Example 47 | ◎ | ◎ | ◎ | ○ | ○ |
| 85 | Comp. Ex. 38 | The test was stopped due to coagulation of urethane resin. | | | | |
| 86 | Comp. Ex. 39 | The test was stopped due to coagulation of urethane resin. | | | | |
| 87 | Comp. Ex. 40 | The test was stopped due to coagulation of urethane resin. | | | | |
| 88 | Comp. Ex. 41 | ◎ | X | X | X | ○ |
| 89 | Comp. Ex. 42 | X | The test was stopped due to gelling of the surface treatment liquid. | | | ○ |
| 90 | Example 48 | ◎ | ◎ | ◎ | ○ | ○ |
| 91 | Example 49 | ◎ | ◎ | ○ | ○ | ○ |
| 92 | Comp. Ex. 43 | The test was stopped due to coagulation of urethane resin. | | | | |
| 93 | Comp. Ex. 44 | The test was stopped due to coagulation of urethane resin. | | | | |
| 94 | Example 50 | ◎ | ◎ | ◎ | ◎ | ○ |
| 95 | Comp. Ex. 45 | ◎ | ○ | X | X | ○ |

The coated steel sheet product samples manufactured by using the surface treatment agent samples of the present invention are unanimously excellent in each of corrosion resistance in a flat surface portion, corrosion resistance in a processed portion, corrosion resistance after degreasing, anti-black patina property, heat discoloration resistance, paintability (without degreasing or after degreasing), and solvent resistance, as shown in Tables 13-1, 13-2 and 13-3. Further, it is understood from the results of storage stability shown in Tables 13-1, 13-2 and 13-3 that the surface treatment agent samples of the present invention unanimously maintain good quality in a stable manner before and after a storage period.

In contrast, Comparative Example 1 (sample No. 4), which was beyond the scope of the present invention due to too low content of the cationic urethane resin emulsion (B), exhibited very poor corrosion resistance at a bending-processed portion and corrosion resistance thereof further deteriorated after storage of the surface treatment agent. Comparative Example 2 (sample No. 7), which was beyond the scope of the present invention due to too high content of the cationic urethane resin emulsion (B), exhibited poor quality after alkali degreasing and unsatisfactory solvent resistance. Comparative Example 3 (sample No. 8) and Comparative Example 4 (sample No. 9), each lacking the organic titanium chelate compound (D) of the present invention, failed to obtain satisfactory quality in at least one of corrosion resistance at a bending-processed portion and corrosion resistance after alkali degreasing.

Comparative Example 5 (sample No. 10) and Comparative Example 7 (sample No. 12) and Comparative Example 8 (sample No. 13), each lacking the quadrivalent vanadyl compound (E) of the present invention, exhibited very poor corrosion resistance at a bending-processed portion and corrosion resistance thereof further deteriorated after storage of the surface treatment agent. Comparative Example 6 (sample No. 11), using a pentavalent vanadyl compound, failed to obtain good results in corrosion resistance at a bending-processed portion and corrosion resistance after alkali degreasing and exhibited deterioration of paintability after alkali degreasing. Comparative Example 9 (sample No. 14), although it employed the quadrivalent vanadyl compound (E), exhibited very poor corrosion resistance at a bending processed portion and solvent resistance, as well as poor corrosion resistance after storage, because Comp. Example 9 lacks the organic titanium chelate compound (D). Comparative Example 7 (sample No. 12) and Comparative Example 9 (sample No. 14) were carried out in view of JP-B 3883831 and JP-A 2006-152436, respectively.

Comparative Example 10 (sample No. 20), which was beyond the scope of the present invention due to too low solid content of the silane coupling agent (C), exhibited poor solvent resistance. Comparative Example 11 (sample No. 23), which was beyond the scope of the present invention due to too high solid content of the silane coupling agent (C), exhibited very poor corrosion resistance at a bending-processed portion and the situation worsened in terms of corrosion resistance after storage of the surface treatment agent. Comparative Example 12 (sample No. 24), which was beyond the scope of the present invention due to too high mass (solid content) ratio of the silane coupling agent (C) with respect to titanium of the organic titanium chelate compound (D), exhibited poor corrosion resistance after alkali degreasing and paintability. Comparative Example 13 (sample No. 27), which was beyond the scope of the present invention due to too low mass (solid content) ratio of the silane coupling agent (C) with respect to titanium of the organic titanium chelate compound (D), exhibited very poor corrosion resistance at a bending-processed portion and corrosion resistance thereof further deteriorated after storage of the surface treatment agent.

Comparative Example 14 (sample No. 29), which was beyond the scope of the present invention due to too low mass ratio of vanadium of the quadrivalent vanadyl compound (E) with respect to titanium of the organic titanium chelate compound (D), exhibited very poor corrosion resistance. Comparative Example 15 (sample No. 31), which was beyond the scope of the present invention due to too high mass ratio of vanadium of the quadrivalent vanadyl compound (E) with respect to titanium of the organic titanium chelate compound (D), exhibited poor corrosion resistance after alkali degreasing and paintability.

Comparative Examples 16 to 23 (samples Nos. 34, 35, 38, 39, 42, 43, 46, 47), each of which was beyond the scope of the present invention due to too low solid content of the molybdic acid compound (F) as a key element of the present invention, unanimously exhibited poor anti-black patina property. Comparative Example 24 (sample No. 52), which was beyond the scope of the present invention due to too high solid content of the molybdic acid compound (F), exhibited gelling of the surface treatment agent sample, thereby forcing the test to stop at that stage.

Comparative Examples 25 to 27 (samples Nos. 59, 60, 63), where pH values of the surface treatment agent samples had not been adjusted adequately, exhibited very poor corrosion resistance and poor storage stability. Comparative Example 28 (sample No. 64), where pH values of the surface treatment agent samples was very high, exhibited gelling of the surface treatment agent sample and the test had to be stopped.

Comparative Example 29 (sample No. 65), which was beyond the scope of the present invention due to too low film coating weight of the surface treatment film, cannot have sufficient corrosion resistance. Comparative Example 30 (sample No. 70), which was beyond the scope of the present invention due to too high film coating weight of the surface treatment film, exhibited poor paintability.

Comparative Example 31 (sample No. 71), which was beyond the scope of the present invention due to too low drying temperature, failed to exhibit sufficient corrosion resistance after alkali degreasing. Comparative Example 32 (sample No. 74), which was beyond the scope of the present invention due to too high drying temperature, exhibited deterioration in corrosion resistance at a bending-processed portion and paintability.

Regarding the resin compound (A), Comparative Example 33 (sample No. 76), Comparative Example 34 (sample No. 77), Comparative Example 38 (sample No. 85) and Comparative Example 39 (sample No. 86), each of which was beyond the scope of the present invention in terms of the number of carbon atoms of the group z, and Comparative Example 35 (sample No. 78) and Comparative Example 40 (sample No. 87), each of which was beyond the scope of the present invention due to too small average substitution number of the group z per benzene ring, unanimously exhibited presence of undissolved materials or incomplete dissolution at the stage of preparing the surface treatment agent samples. Comparative Example 36 (sample No. 79) and Comparative Example 41 (sample No. 88), each of which was beyond the scope of the present invention due to too large average substitution number of the group z per benzene ring, failed to maintain good quality of the surface treatment agent samples in a stable manner before, during and after a storage period, respectively. Comparative Example 37 (sample No. 80) and Comparative Example 42 (sample No. 89), each of which was beyond the scope of the present invention due to too high number average degree of polymerization, each exhibited gelling of the surface treatment agent sample after storage.

Comparative Example 43 (sample No. 92) employing non-ionic urethane resin emulsion and Comparative Example 44 (sample No. 93) employing anionic urethane resin emulsion exhibited coagulation of urethane resin at the stage of preparing the surface treatment agent samples, respectively. Comparative Example 45 (sample No. 95), which was beyond the scope of the present invention in terms of the silane coupling agent, failed to have good corrosion resistance after alkali degreasing.

INDUSTRIAL APPLICABILITY

According to the present invention, it is possible to supply without relying on chromating treatment a coated steel sheet subjected to additional surface treatment, which is excellent in corrosion resistance (corrosion resistance at a bending-processed portion in particular), heat resistance, paintability, solvent resistance and anti-black patina property. Further, the one-pack type surface treatment agent of the present invention, capable of maintaining good quality before, during and after storage, causes a superior effect of reducing cost and waste in production.

The invention claimed is:

1. A surface treatment agent for a zinc or zinc alloy coated steel sheet, comprising:
    (A) resin compound having a bisphenol skeleton represented by general formula (I) below;
    (B) cationic urethane resin emulsion having at least one type of cationic functional group selected from primary amine, secondary amine, tertiary amine or quaternary ammonium salt;
    (C) at least one type of silane coupling agent having at least one type of reactive functional group selected from active hydrogen-containing amino group, epoxy group, mercapto group armor methacryloxy group;
    (D) organic titanium chelate compound;
    (E) quadrivalent vanadyl compound;
    (F) molybdic acid compound; and
    (G) water, such that conditions (1) to (5) below are satisfied, pH of the surface treatment agent being in the range of 4 to 5,
    wherein: (1) $[(B_s)/\{(A_s)+(B_s)+(C_s)\}]$ as a mass ratio of solid content $(B_s)$ of the cationic urethane resin emulsion (B) with respect to total solid content $\{(A_s)+(B_s)+(C_s)\}$ of the resin compound (A), the cationic urethane resin emulsion (B) and the silane coupling agent (C) is in the range of 0.1 to 0.3;

(2) $[(C_s)/\{(A_s)+(B_s)+(C_s)\}]$ as a mass ratio of solid content $(C_s)$ of the silane coupling agent (C) with respect to total solid content $\{(A_s)+(B_s)+(C_s)\}$ of the resin compound (A), the cationic urethane resin emulsion (B) and the silane coupling agent (C) is in the range of 0.6 to 0.85;

(3) $\{(C_s)/(D_{Ti})\}$ as a mass ratio of solid content $(C_s)$ of the silane coupling agent (C) with respect to mass content $(D_{Ti})$ in terms of titanium of the organic titanium chelate compound (D) is in the range of 50 to 70;

(4) $\{(E_V)/(D_{Ti})\}$ as a mass ratio of mass content $(E_V)$ in terms of vanadium of the quadrivalent vanadyl compound (E) with respect to mass content $(D_{Ti})$ in terms of titanium of the organic titanium chelate compound (D) is in the range of 0.3 to 0.5;

(5) $[(F_{Mo})/\{(A_s)+(B_s)+(C_s)\}]$ as a mass ratio of mass content $(F_{Mo})$ in terms of molybdenum of the molybdic acid compound (F) with respect to total solid content $\{(A_s)+(B_s)+(C_s)\}$ of the resin compound (A), the cationic urethane resin emulsion (B) and the silane coupling agent (C) is in the range of 0.003 to 0.03;

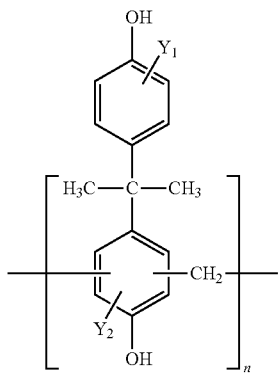

(I)

in formula (I), $Y_1$ and $Y_2$ bonded to benzene rings, respectively, are each independently hydrogen or group z represented by general formula (II) or (III) below, the average substitution number of the group z per benzene ring is in the range of 0.2 to 1.0, and n represents integer in the range of 2 to 50:

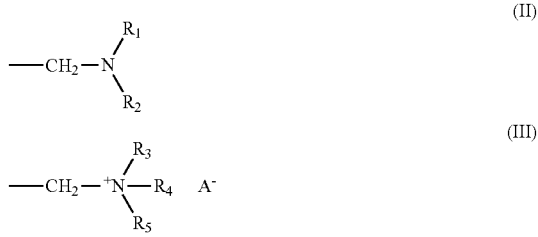

in formula (II) and formula (III), $R_1$, $R_2$, $R_3$, $R_4$ and $R_5$ each independently represent hydrogen atom, $C_{1-10}$ alkyl group or $C_{1-10}$ hydroxyalkyl group, and $A^-$ represents hydroxyl ion or acid ion.

2. The surface treatment agent for a zinc or zinc alloy coated steel sheet of claim 1, further comprising (W) wax, wherein $[(W_s)/\{(A_s)+(B_s)\}]$ as a mass ratio of solid content $(W_s)$ of the wax (W) with respect to total solid content $\{(A_s)+(B_s)\}$ of the resin compound (A) and the cationic urethane resin emulsion (B) is in the range of 0.2 to 0.4.

3. A method for manufacturing a zinc or zinc alloy coated steel sheet, comprising:
coating a surface of a zinc or zinc alloy coated steel sheet with the surface treatment agent of claim 1 or 2; and
drying the zinc or zinc alloy coated steel sheet thus coated such that the peak temperature of the steel sheet is in the range of 50° C. to 180° C. to form a surface treatment film on the surface,
wherein a film coating weight of the surface treatment film per one surface after the drying process is in the range of 0.2 g/m² to 1.8 g/m².

4. A zinc or zinc alloy coated steel sheet, having a surface treatment film provided thereon such that a film coating weight of the coating film per one surface of the steel sheet is in the range of 0.2 g/m² to 1.8 g/m²,
wherein the surface treatment film is obtainable by coating a surface of the zinc or zinc alloy coated steel sheet with the surface treatment agent of claim 1 or 2 and drying the zinc or zinc alloy coated steel sheet thus coated such that the peak temperature of the steel sheet is in the range of 50° C. to 180° C.

* * * * *